(12) United States Patent
Chenault et al.

(10) Patent No.: US 8,202,963 B2
(45) Date of Patent: Jun. 19, 2012

(54) TISSUE ADHESIVES WITH MODIFIED ELASTICITY

(75) Inventors: Henry Keith Chenault, Hockessin, DE (US); Garret D. Figuly, Wilmington, DE (US)

(73) Assignee: Actamax Surgical Materials, LLC, Berkeley, CA (US)

( * ) Notice: Subject to any disclaimer, the term of this patent is extended or adjusted under 35 U.S.C. 154(b) by 0 days.

(21) Appl. No.: 13/102,262

(22) Filed: May 6, 2011

(65) Prior Publication Data
US 2011/0269916 A1 Nov. 3, 2011

Related U.S. Application Data

(62) Division of application No. 11/820,834, filed on Jun. 21, 2007, now Pat. No. 7,960,498.

(60) Provisional application No. 60/817,758, filed on Jun. 30, 2006.

(51) Int. Cl.
*C08G 73/02* (2006.01)
*C08G 69/08* (2006.01)

(52) U.S. Cl. ....................... 528/422; 528/310

(58) Field of Classification Search ................. 528/422, 528/310
See application file for complete search history.

(56) References Cited

U.S. PATENT DOCUMENTS

| 4,766,245 A | 8/1988 | Larkin et al. |
| 5,830,986 A | 11/1998 | Merrill et al. |
| 2003/0119985 A1 | 6/2003 | Sehl et al. |
| 2004/0225097 A1 | 11/2004 | Nho et al. |
| 2005/0020805 A1 | 1/2005 | Sunkara et al. |
| 2006/0078536 A1 | 4/2006 | Kodokian et al. |

FOREIGN PATENT DOCUMENTS

| WO | 9730103 A2 | 8/1997 |
| WO | 03035122 A1 | 5/2003 |

OTHER PUBLICATIONS

Xuan Zhao et al., Novel Degradable Poly(ethylene glycol) Esters for Drug Delivery, American Chemical Society, pp. 458-472 (1997).
Edward W. Merrill, Poly(ethylene oxide) star molecules: Synthesis, characterization, and applications in medicine and biology, J. Biomater, Sci. Polymer Edn., vol. 5, No. 1/2, pp. 1-11 (1993).
Andreas F. Buckmann et al., Functionalization of Poly(Ethylene Glycol) and Monomethoxy-poly(Ethylene Glycol), Makromol. Chem., 1981, vol. 182:1379-1384.
Samuel Zalipsky et al., Preparation and Applications of Polyethylene Glycol-Polystyrene Graft Resin Supports for Solid-Phase Peptide Synthesis, Reactive Polymers, 1994, vol. 22:243-258.

(Continued)

*Primary Examiner* — Duc Truong
(74) *Attorney, Agent, or Firm* — McCarter & English

(57) ABSTRACT

An embodiment of the invention is a water soluble chain-extended polyamine product made by a process comprising reacting a multi-arm polyether amine with a bifunctional crosslinker of the formula: $X^1$—R—$X^2$. Another embodiment is a water soluble chain-extended polyamine product made by a process comprising reacting a multi-arm polyether having at least three arms and three electrophilic endgroups with a primary diamine crosslinker of the formula: $NH_2$—$R^2$—$NH_2$, followed by treating of the chain-extended product so as to convert the remaining electrophilic endgroups to amine endgroups. Crosslinking of the chain-extended polyamine products with an oxidized polysaccharide provides useful tissue adhesives with modified elasticity, that provides greater compliance to underlying tissue, and improved stability in aqueous environments.

10 Claims, 2 Drawing Sheets

OTHER PUBLICATIONS

Richard B. Greenwald et al., Drug Delivery Systems Employing 1,4- or 1,6-Elimination: Poly (Ethylene Glycol) Prodrugs of Amine-Containing Compounds, J. Med. Chem., 1999, vol. 42:3657-3667.

Yukio Nagasaki et al., Formyl-Ended Heterobifunctional Poly(Ethylene Oxide): Synthesis of Poly(Ethylene Oxide) With a Formyl Group at One End and a Hydroxyl Group at the Other End, Bioconjugate Chem., 1995, vol. 6:231-233.

Tony Azzam et al., Cationic Polysaccharides for Gene Delivery, Macromolecules, 2002, vol. 35:9947-9953.

V. A. Lara et al., Dentin-Induced In Vivo Inflammatory Response and In Vitro Activation of Murine Macrophages, J. Dental Res., 2003, vol. 82:460-465.

U.S. Appl. No. 11/244,756, filed Oct. 6, 2005, Applicant: George K. Kodokian et al.

U.S. Appl. No. 11/732,952, filed Apr. 5, 2007, Henry Keith Chenault et al.

TISSUE ADHESIVES WITH MODIFIED ELASTICITY

CROSS-REFERENCE TO RELATED APPLICATION

This application is a divisional application of U.S. application Ser. No. 11/820,834, filed Jun. 21, 2007 now U.S. Pat. No. 7,960,498, which claims priority under 35 U.S.C. §119 from U.S. Provisional Application Ser. No. 60/817,758, filed Jun. 30, 2006 the contents of which are hereby incorporated by reference in its entirety.

FIELD OF THE INVENTION

The invention relates to the field of medical adhesives. More specifically, the invention relates to a polymer tissue adhesive with modified elasticity formed by reacting an oxidized polysaccharide with a water soluble, chain-extended multi-arm polyether amine.

BACKGROUND OF THE INVENTION

Tissue adhesives have many potential medical applications, including topical wound closure, supplementing or replacing sutures or staples in internal surgical procedures, adhesion of synthetic onlays or inlays to the cornea, drug delivery devices, and as anti-adhesion barriers to prevent post-surgical adhesions. Conventional tissue adhesives are generally not suitable for a wide range of adhesive applications. For example, cyanoacrylate-based adhesives have been used for topical wound closure, but the release of toxic degradation products limits their use for internal applications. Fibrin-based adhesives are slow curing, have poor mechanical strength, and pose a risk of viral infection. Additionally, the fibrin-based adhesives do not covalently bind to the underlying tissue.

Several types of hydrogel tissue adhesives have been developed, which have improved adhesive and cohesive properties and are nontoxic. These hydrogels are generally formed by reacting a component having nucleophilic groups with a component having electrophilic groups, which are capable of reacting with the nucleophilic groups of the first component, to form a crosslinked network via covalent bonding. However, these hydrogels typically swell or dissolve away too quickly, or lack sufficient adhesion or mechanical strength, thereby decreasing their effectiveness as surgical adhesives.

Examples of hydrogel tissue adhesives are described by Sehl et al. in U.S. Patent Application Publication No. 2003/0119985. The adhesives are formed by reacting a hydrophilic polymer, such as collagen, with a crosslinkable component having nucleophilic groups and a crosslinkable component having electrophilic groups. The crosslinkable components include various activated forms of polyethylene glycol. Goldmann et al. in WO 03/035122 describe a hydrogel tissue adhesive formed by reacting chitosan or a modified polyvinyl alcohol bearing amino groups with an oxidized polysaccharide, such as oxidized dextran. Neither of these disclosures describes a polymer adhesive formed by reacting an oxidized polysaccharide with a water soluble, multi-arm polyether amine.

Therefore, the problem to be solved is to provide a tissue adhesive material with improved characteristics for use in surgical procedures as well as other medical applications. Applicants have addressed the stated problem by discovering a polymer tissue adhesive formed by reacting an oxidized polysaccharide with a water-soluble, multi-arm polyether amine as disclosed in U.S. patent application Ser. No. 11/244,756, filed on Oct. 6, 2005 and published as US 2006/0078536 A1.

Applicants herein further address the stated problem by discovering a tissue adhesive having modified elasticity and improved stability derived from reacting an oxidized polysaccharide with a chain-extended polyamine product of the invention.

SUMMARY OF THE INVENTION

One embodiment of the invention is a composition of matter made by a process comprising: reacting, optionally in a first reaction solvent, at least one multi-arm polyether amine having at least three arms with at least one bifunctional crosslinker of the formula:

$$X^1\text{—}R\text{—}X^2$$

the molar ratio of the multi-arm polyether amine to the bifunctional crosslinker being in the range of about 4:1 to about 50:1, thereby forming a chain-extended polyamine product; and wherein:
  (i) at least three of the arms of the multi-arm polyether amine are terminated by a primary amine group;
  (ii) the multi-arm polyether amine has a weight-average molecular weight of about 450 to about 200,000 Daltons;
  (iii) $X^1\text{—}R\text{—}X^2$ is a polymer having a weight-average molecular weight of about 2,000 to about 20,000 Daltons;
  (iv) R is a divalent polymer group;
  (v) $X^1$ and $X^2$ are groups capable of reacting with the primary amine group to form a carbon-nitrogen bond;
provided that the chain-extended polyamine product is characterized by a solubility in water at 20° C. of at least 20 wt %.

Another embodiment of the invention is a composition of matter made by a process comprising the steps of: (a) reacting, optionally in a second reaction solvent, at least one multi-arm polyether having at least three arms and having at least three electrophilic endgroups, with a primary diamine crosslinker of the formula:

$$NH_2\text{—}R^2\text{—}NH_2$$

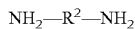

the molar ratio of the multi-arm polyether to the primary diamine crosslinker being in the range of about 4:1 to about 50:1, thereby forming a chain-extended polymer having remaining electrophilic endgroups; and, (b) treating, optionally in a third reaction solvent, said chain extended polymer so as to convert the remaining electrophilic end groups to amine end groups to provide a chain-extended polyamine product; wherein:
  (i) at least three of the arms of said multi-arm polyether are terminated by electrophilic endgroups capable of reacting with a primary amine to form a carbon-nitrogen bond;
  (ii) the multi-arm polyether has a weight-average molecular weight of about 450 to about 200,000 Daltons;
  (iii) $R^2$ is a divalent polymer group;
  (iv) $NH_2\text{—}R^2\text{—}NH_2$ is a polymer having a weight-average molecular weight of about 2,000 to about 20,000 Daltons;
provided that the chain-extended polyamine product is characterized by a solubility in water at 20° C. of at least 20 wt %.

Tissue adhesives derived from the reaction of an oxidized polysaccharide and a chain-extended polyamine product of the invention exhibit improvement in one or more of the following attributes: adhesion and cohesion properties, crosslinking readily at body temperature; maintenance of initial dimensional stability, stability in aqueous environments; non-toxicity to cells and non-inflammatory to tissue. The improvements generally realized herein are increased elasticity, which provides greater compliance to the underlying tissue; and stability.

DETAILED DESCRIPTION OF THE INVENTION

Figure 1:
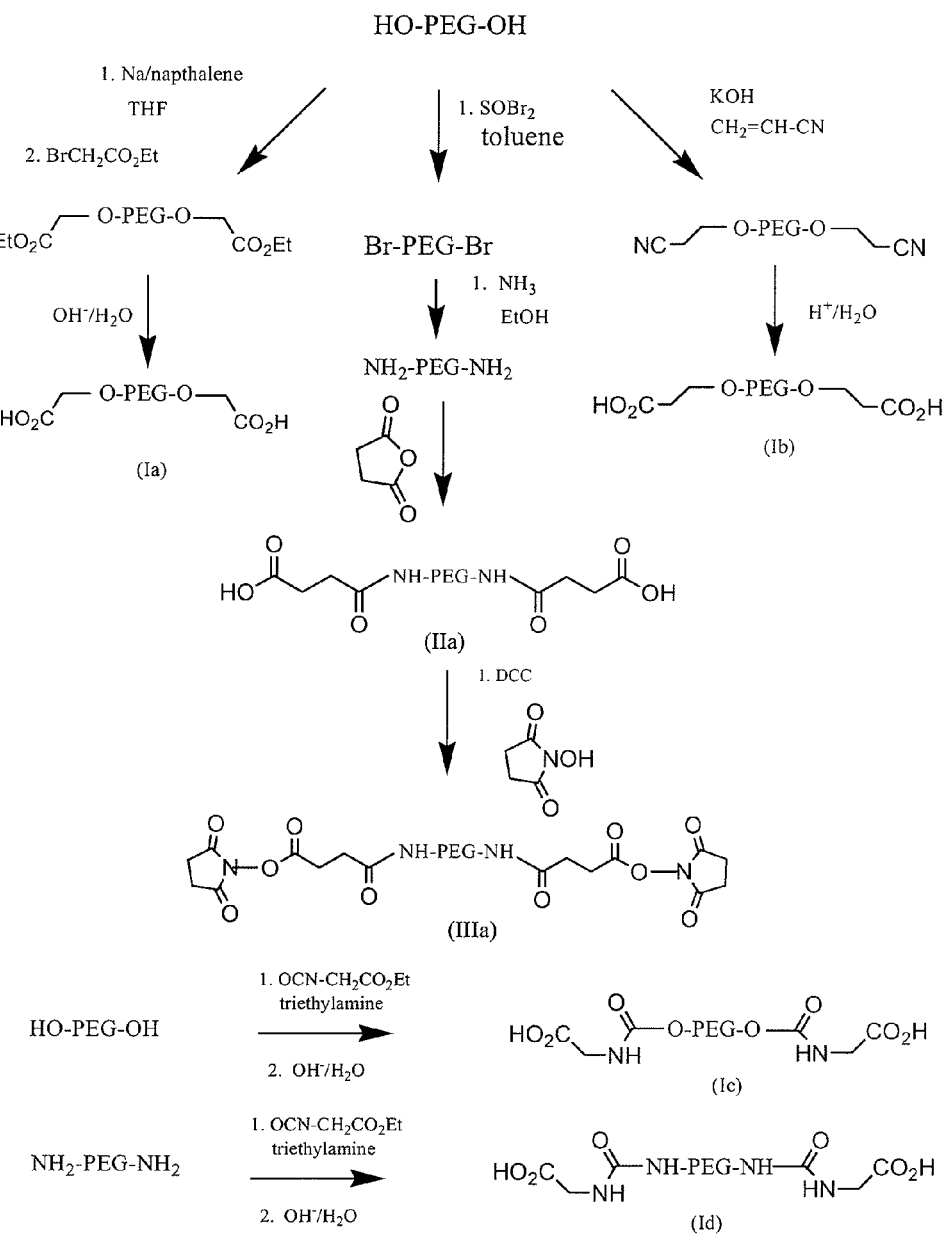
FIG. 1 illustrates synthetic routes for bifunctional crosslinkers useful in the invention.

The invention relates to a chain-extended polyamine product useful in providing an improved tissue adhesive by reacting an oxidized polysaccharide with a water-soluble chain-extended polyamine product comprising a multi-arm polyether amine, wherein at least three of the arms are terminated by a primary amine group. The polymer adhesive is useful as an adhesive for medical and veterinary applications including, but not limited to, topical wound closure, and surgical procedures, such as intestinal anastomosis, vascular anastomosis, tissue repair, hemostasis and ophthalmic procedures. Additionally, the polymer adhesive may have utility in drug delivery, anti-adhesive applications, and as a bulking agent to treat urinary incontinence.

The following definitions are used herein and should be referred to for interpretation of the claims and the specification.

The terms "oxidized polysaccharide" and "polysaccharide dialdehyde" are used interchangeably herein to refer to a polysaccharide which has been reacted with an oxidizing agent to introduce aldehyde groups into the molecule.

The term "equivalent weight per aldehyde group" refers to the molecular weight of the oxidized polysaccharide divided by the number of aldehyde groups introduced in the molecule.

Herein the terms polyethylene oxide (PEO) and polyethylene glycol (PEG) are synonymous. Herein the terms polypropylene oxide (PPO) and polypropylene glycol (PPG) are synonymous.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

A first embodiment of the invention, is a composition of matter made by a process comprising: reacting, optionally in a first reaction solvent, at least one multi-arm polyether amine having at least three arms with at least one bifunctional crosslinker of the formula:

the molar ratio of the at least one multi-arm polyether amine to the bifunctional crosslinker being in the range of about 4:1 to about 50:1, thereby forming a chain extended polyamine product;

wherein:
(i) at least three of the arms of the multi-arm polyether amine are terminated by a primary amine group;
(ii) the multi-arm polyether amine has a weight-average molecular weight of about 450 to about 200,000 Daltons;
(iii) $X^1$—R—$X^2$ is a polymer having a weight-average molecular weight of about 2,000 to about 20,000 Daltons;
(iv) R is a divalent polymer group;
(v) $X^1$ and $X^2$ are groups capable of reacting with the primary amine group to form a carbon-nitrogen bond;
provided that the chain-extended polyamine product is characterized by a solubility in water at 20° C. of at least 20 wt %.

The term "multi-arm polyether amine" refers to a branched polyether, having at least three arms that are terminated by a primary amine group, which is water soluble and capable of reacting with a second reactant in aqueous solution.

The multi-arm polyether amines are polyethers having the repeat unit [—O—$R^3$]—, wherein $R^3$ is an hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyether amines useful in the invention include dendritic, comb, and star branched and hyperbranched polyethers wherein at least three of the arms are terminated by a primary amine group. The multi-arm polyether amines have a weight-average molecular weight ($M_w$) of about 450 to about 200,000 Daltons, preferably from about 2,000 to about 40,000 Daltons. Suitable examples of water-soluble, multi-arm polyether amines include, but are not limited to, amino-terminated star, dendritic, or comb polyethylene oxides; amino-terminated star, dendritic or comb polypropylene oxides; amino-terminated star, dendritic or comb polyethylene oxide-polypropylene oxide copolymers; and polyoxyalkylene triamines, sold under the trade name Jeffamine® triamines, by Huntsman LLC. (Houston, Tex.). Examples of star polyethylene oxide amines, include, but are not limited to, various multi-arm polyethylene glycol amines, available from Nektar Transforming Therapeutics (Huntsville, Ala.), and star polyethylene glycols having 3, 4, 6 or 8 arms terminated with primary amines (referred to herein as 3, 4, 6 or 8-arm PEG amines, respectively). An 8-arm PEG amine, $M_w$ 10,000, is available from Nektar Transforming Therapeutics. Examples of suitable Jeffamine®triamines include, but are not limited to, Jeffamine® T-403 (CAS No. 39423-51-3), Jeffamine® T-3000 (CAS No. 64852-22-8), and Jeffamine® T-5000 (CAS No. 64852-22-8). In one preferred embodiment, the water-soluble multi-arm polyether amine is an eight-arm PEG having eight arms terminated by a primary amine group and having a weight-average molecular weight of about 9,000 to about 11,000 Daltons.

These multi-arm polyether amines are either available commercially, as noted above, or may be prepared using methods known in the art. For example, Larkin et al. (U.S. Pat. No. 4,766,245) describe the conversion of three-arm and 8-arm poly(propylene glycols) to the corresponding polyamines by reaction with ammonia in the presence of hydrogen and a Raney nickel/aluminum catalyst. Nho et al. (U.S. Patent Application Publication No. U.S. 2004/0225097) describe the conversion of multi-arm PEG polyols to their corresponding multi-arm PEG amines by tosylation followed by reaction with aqueous ammonia for ten days. Additionally, Bückmann et al. (*Makromol. Chem.* 182:1379-1384 (1981)) describe the conversion of linear PEG to the corresponding diamine via a two step reaction comprising reacting the PEG with thionyl bromide to form the bromide derivative, followed by reaction with ethanolic ammonia. A preferred method broadly applicable to the preparation of multi-arm polyether amines with high conversion of end-groups to amines, is disclosed in U.S. application Ser. No. 11/732,952, filed Apr. 5, 2007. The method comprises reacting thionyl chloride and at least one multi-arm PEG polyol having from 3 to about 10 arms, to form a multi-arm PEG chloride having at least about 95% of hydroxyl end groups of the multi-arm PEG polyol converted to chloride end groups; separating the multi-arm PEG chloride from unreacted thionyl chloride, and reacting the multi-arm PEG chloride with either aqueous ammonia or anhydrous ammonia to form a reaction product in which at least about 95% of the chloride end groups of the multi-arm PEG chloride are converted to amine end groups. Other methods that may be used for preparing multi-arm polyether amines are described by Merrill et al. in U.S. Pat. No. 5,830,986, and by Chang et al. in WO 97/30103.

It should be recognized that the multi-arm polyether amines and the multi-arm polyethers described above are generally a somewhat heterogeneous mixture having a distribution of arm lengths and in some cases, a distribution of species with different numbers of arms. When a multi-arm polyether or multi-arm polyether amine has a distribution of species having different numbers of arms, it can be referred to based on the average number of arms in the distribution. For example, in one embodiment the multi-arm polyether amine is an 8-arm star PEG amine, which comprises a mixture of multi-arm star PEG amines, some having less than and some having more than 8 arms; however, the multi-arm star PEG amines in the mixture have an average of 8 arms. Therefore, the terms "8-arm", "6-arm", "4-arm" and "3-arm" as used herein to refer to multi-arm polyethers and multi-arm polyether amines, should be construed as referring to a heterogeneous mixture having a distribution of arm lengths and in some cases, a distribution of species with different numbers of arms, in which case the number of arms recited refers to the average number of arms in the mixture.

Bifunctional crosslinkers useful in the invention are of the formula:

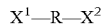

and are polymers having a weight-average molecular weight of about 2,000 to about 20,000 Daltons.

The functional groups $X^1$ and $X^2$ can be any groups capable of reacting with a primary amine group to form a carbon-nitrogen bond. Preferably, $X^1$ and $X^2$ are the same on any specific bifunctional crosslinker. Preferably $X^1$ and $X^2$ are selected from the group: —CHO, —CO$_2$H, —CO$_2$R$^1$, —NCO, —NCS, —COCl, —COBr, —COF, —OMs (wherein Ms is methanesulfonyl), —OTs (wherein, Ts is toluenesulfonyl), and —OTf (wherein Tf is trifluoromethanesulfonyl), tresylate (2,2,2,-trifluoroethanesulfonate), Cl, Br, I, and glycidyl ether; wherein $R^1$ is N-succinimidyl, 4-nitrophenyl, 2,4-dinitrophenyl, or pentafluorophenyl radical. Especially preferred are $X^1$ and $X^2$ groups known to be good leaving groups in nucleophilic substitution reactions, including those selected from the group: —OMs, —OTs, —OTf, tresylate, Cl, Br, and I.

Other preferred $X^1$ and $X^2$ groups include: carboxylic acids and reactive carboxylic esters that may be coupled with a primary amine group to form an amide linkage; isocyanates that may be coupled with a primary amine group to form urea linkage; aldehydes that may condense with primary amines to provide imines, and optionally may be reduced to secondary amines; and reactive epoxy groups, for instance glycidyl ethers, that may be coupled with a primary amine group to form a secondary amine.

The R group may be any divalent polymer group that, when combined with $X^1$ and $X^2$, falls within the prescribed molecular weight range of the bifunctional crosslinker. Preferably R is a divalent polymer group that is characterized by a high affinity for water, such that if $X^1$ and $X^2$ are hydroxyl groups, the corresponding diol, HO—R—OH, has at least 1 wt % solubility in water at 20 and 38° C.

The divalent polymer group R can be in the form of a homopolymer or a block or random copolymer. Herein copolymer refers to a polymer derived from two or more repeat units. Preferably R is a divalent polymer group derived from repeat units of one or more monomers selected from the group consisting of: ethylene oxide, propylene oxide, vinyl acetate, vinyl alcohol, N-vinyl pyrrolidone, and oxetane.

Preferred bifunctional crosslinkers $X^1$—R—$X^2$ for the invention comprise a divalent polymer group R selected from the group consisting of: divalent homopolymers of ethylene oxide; and divalent block and random copolymers of ethylene oxide and propylene oxide.

The hydroxy terminated polymers useful in preparing these bifunctional crosslinkers are commercially available. For instance, polyethylene glycols with nominal molecular weights of 2000, 4000, 6000, and 8000 are available from Aldrich Chemical Co. Tri-block copolymers of polyethylene oxide and polypropylene oxide (PEG-PPG-PEG) are available from BASF, Mount Olive, N.J., under the PLURONIC® trade name with nominal molecular weights of 1850 to 14,600.

The bifunctional crosslinkers $X^1$—R—$X^2$ for the invention are available by well known synthetic pathways. For instance, bifunctional crosslinkers wherein $X^1$ and $X^2$ are mesylate, tosylate, tresylate or triflate can be made by treating the corresponding hydroxyl terminated polymers with methanesulfonyl chloride, toluenesulfonyl chloride, 2,2,2,-trifluoroethanesulfonyl chloride and trifluoromethanesulfonyl chloride, respectively, in an aprotic solvent such as dichloromethane, in the presence of a base, such as triethylamine or pyridine. Bifunctional crosslinkers wherein $X^1$ and $X^2$ are chloride and bromide can be made by treating the corresponding hydroxyl terminated polymers with thionyl chloride and thionyl bromide, respectively, in an aprotic solvent such as toluene. Further treatment of the chloride or bromide with potassium iodide in a polar aprotic solvent such as N,N-dimethylformamide (DMF) can provide the corresponding iodide.

Other preferred bifunctional crosslinkers for the invention include carboxy terminated polymers having carboxylic acid, carboxylic acid halide or reactive ester terminal groups selected from the group: homopolymers of ethylene oxide and block and random copolymers of ethylene oxide and propylene oxide. These materials are available by synthesis following the routes outlined in FIG. 1 and the methods described by Bückmann, A. F., et al., *Makromolekulare Chemie,* 182, 1379-1384, (1981). For instance, hydroxy terminated PEG can be carboxymethylated by treatment with sodium naphthalene in tetrahydrofuran (THF) followed by alkylation with ethyl 2-bromoacetate and hydrolysis of the ester to provide carboxy methyl terminated PEG of formula (Ia). In another pathway, hydroxy terminated PEG can be treated with base and acrylonitrile to provide the Michael addition product followed by acidic hydrolysis of the nitrile to provide the carboxy ethyl terminated PEG of formula (Ib). In another pathway, PEG terminated with mesylate, tosylate, tresylate, triflate, chloride, bromide or iodide can be treated with ammonia in a sealed vessel to produce amine terminated PEG. The amine terminated PEG can be transformed to a carboxy terminated PEG as exemplified by treatment with succinic anhydride, to produce the carboxy terminated PEG (IIa). Other preferred anhydrides useful in this sequence include glutaric anhydride, adipic anhydride, caproic anhydride, maleic anhydride and oxybisacetic anhydride. In another pathway, hydroxy terminated PEG and amine terminated PEG can be treated with ethyl 2-isocyanatoacetate followed by hydrolysis of the ester to give urethane linked diacid (Ic) and imide linked diacid (Id), respectively, using procedures similar to those described by Zalipsky, et al, in *Reac. Polym.* (1994) 22, 243-258. Table 1 lists several carboxy terminated PEG bifunctional crosslinkers useful in the invention.

TABLE 1

| Formula No. | Structure |
|---|---|
| (Ia) | HO$_2$C—CH$_2$—O-PEG-O—CH$_2$—CO$_2$H |
| (Ib) | HO$_2$C—CH$_2$CH$_2$—O-PEG-O—CH$_2$CH$_2$—CO$_2$H |
| (Ic) | HO$_2$C—CH$_2$—NH—C(O)—O-PEG-O—C(O)—NH—CH$_2$—CO$_2$H |
| (Id) | HO$_2$C—CH$_2$—NH—C(O)—NH-PEG-NH—C(O)—NH—CH$_2$—CO$_2$H |
| (IIa) | HO$_2$C—CH$_2$CH$_2$—C(O)—NH-PEG-NH—C(O)—CH$_2$CH$_2$—CO$_2$H |
| (IIb) | HO$_2$C—(CH$_2$)$_3$—C(O)—NH-PEG-NH—C(O)—(CH$_2$)$_3$—CO$_2$H |
| (IIc) | HO$_2$C—(CH$_2$)$_4$—C(O)—NH-PEG-NH—C(O)—(CH$_2$)$_4$—CO$_2$H |
| (IId) | HO$_2$C—(CH$_2$)$_5$—C(O)—NH-PEG-NH—C(O)—(CH$_2$)$_5$—CO$_2$H |
| (IIe) | HO$_2$C—CH=CH—C(O)—NH-PEG-NH—C(O)—CH=CH—CO$_2$H |

The carboxy derivatives of formulas (Ia-d) and (IIa-e) can be further transformed to acid chlorides or bromides by treatment with thionyl chloride or thionyl bromide, respectively. Carboxy terminated PEGs can be transformed to reactive esters as exemplified by treatment of (IIa) with dicyclohexylcarbodiimide (DCC) and N-hydroxysuccinimide to provide N-oxy succinimide ester of formula (IIIa) in FIG. 1. Many other PEG terminated activated esters including 4-nitrophenyl, 2,4-dinitrophenyl, or pentafluorophenyl can be prepared in a similar manner using DCC and 4-nitrophenol, 2,4-dinitrophenol and pentafluorophenol, respectively. Table 2 lists several activated ester terminated PEG bifunctional crosslinkers useful in the invention.

TABLE 2

| Formula No. | Structure |
|---|---|
| (IIIa) | *PEG-disuccinate NHS structure* |
| IIIb | *PEG-diglutarate NHS structure* |
| (IIIc) | *PEG-diadipate NHS structure* |
| (IIId) | *PEG-dipimelate (dicaproate) NHS structure* |
| (IIIe) | *PEG-difumarate NHS structure* |
| (IIIf) | *PEG bis(2,4-dinitrophenyl) dicarbonate structure* |
| (IIIg) | *PEG bis(4-nitrophenyl) dicarbonate structure* |
| (IIIh) | *PEG bis(pentafluorophenyl) biscarbamate structure* |
| (IIIi) | *PEG bisurea-NHS structure* |

PEG dicarboxylic diesters are available with molecular weights ranging from 3,400 to 20,000 under the SUN-BRIGHT® trade name from NOF America Corporation, White Plains, N.Y. These commercial products, activated as N-hydroxysuccinimidyl (NHS) esters, include: PEG-dicarboxymethyl NHS, PEG-disuccinate NHS (IIIa), PEG-diglutarate NHS (IIIb), and PEG-dicaproate NHS (IIId). A PEG-di(p-nitrophenyl)carbonate is also available.

Other preferred bifunctional crosslinkers for the invention include aldehyde terminated polymers selected from the group consisting of: homopolymers of ethylene oxide and block and random copolymers of ethylene oxide and propylene oxide. For instance, hydroxy terminated PEG can be treated with sodium naphthalene in tetrahydrofuran (THF) followed by alkylation with 2-bromoacetaldehyde diethyl acetal and hydrolysis of the acetal to provide acetaldehyde terminated PEG. In similar fashion 3-bromopropionaldehyde diethyl acetal can be used to provide propionaldehyde terminated PEG (A-PEG). A commercial source of A-PEG is SUNBRIGHT® DE-050AL (Mw=5,000).

Other preferred bifunctional crosslinkers for the invention include isocyanate or thioisocyanate terminated polymers selected from the group: homopolymer of ethylene oxide and block and random copolymers of ethylene oxide and propylene oxide. For instance, amine terminated PEG can be treated with triphosgene according to Greenwald, et al. (*J. Med. Chem.* (1999) 42, 3657-3667). Hydroxy terminated PEG can be treated with an excess of hexamethylene diisocyanate to provide an isocyanate terminated PEG according to the following scheme:

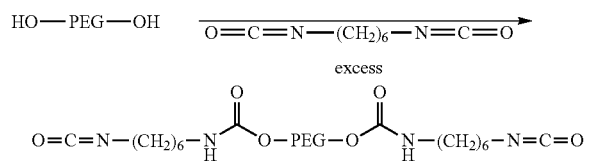

Excess diisocyanate can be removed by various methods including evaporation under reduced pressure, or fractional precipitation of the PEG polymer from solution using a nonsolvent. Other diisocyanates that can be used to modify hydroxy terminated PEG in a similar fashion include, but are not limited to, ethylene diisocyanate, tetramethylene diisocyanate, and methyl pentamethylene diisocyanate.

Other preferred bifunctional crosslinkers for the invention include polymers terminated with reactive epoxy groups, including glycidyl ethers, and selected from the group: homopolymers and block and random copolymers of ethylene oxide and propylene oxide. The hydroxy terminated polymers useful in preparing these epoxy bifunctional crosslinkers are commercially available as disclosed above. The synthesis of epoxy bifunctional crosslinkers can be accomplished according to the following scheme:

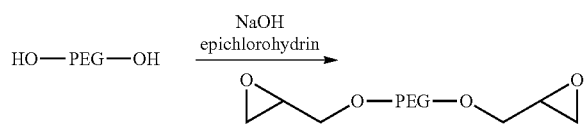

Heterobifunctional PEGs wherein $X^1$ and $X^2$ are different functional groups are useful as bifunctional crosslinkers in the invention. The preparation of heterobifunctional PEG containing polymers is described in several articles in "Poly (ethylene glycol) Chemistry and Biological Applications", J. Milton Harris and Samuel Zalipsky eds., ACS Symposium Series 680, American Chemical Society, Washington D.C. (1997).

Several useful heterobifunctional crosslinkers include those provided by synthesis from PEG monochloride using, methods similar to those outlined by Zalipsky et al, *React. Polym.* (1994), 22, 243-258, according to the following schemes:

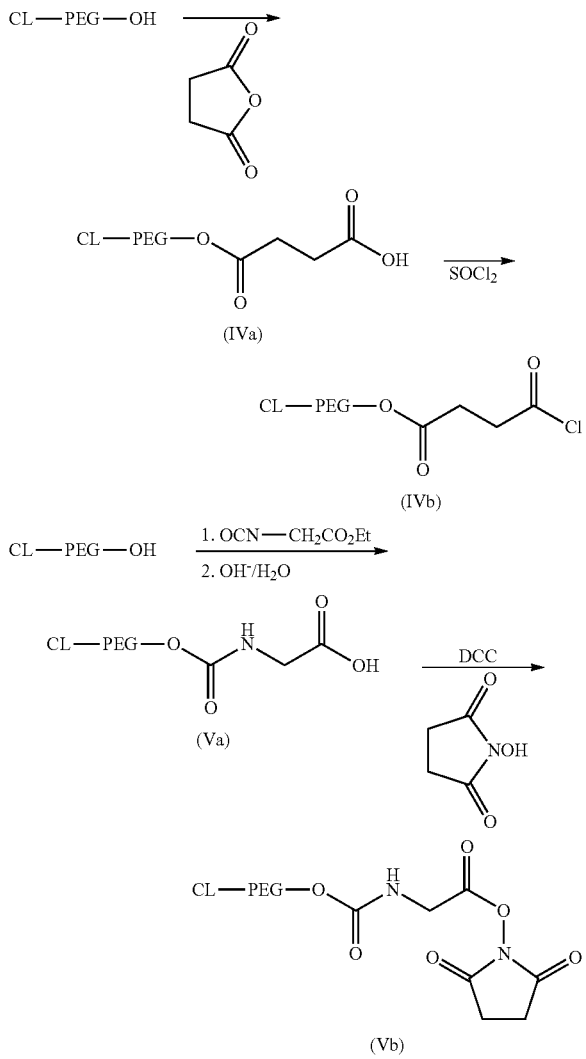

The intermediate monoacids are separated from homofunctional impurities by ion exchange chromatography to provide the pure heterobifunctional compounds of formula (IVa-b) and (Va-b).

Other useful heterobifunctional crosslinkers are provided by synthesis from the PEG propionaldehyde (A-PEG-OH) that is available when 3,3-diethoxypropyl alkoxide is used as an initiator for ethylene oxide (EO) polymerization according to the procedures described by Nagasaki, et al, (*Bioconjugate Chem.*, (1995) 6, 231). A-PEG-OH is commercially available in nominal $M_w$ of 500-3000 from NOF Corporation. Aldehyde heterobifunctional crosslinkers that can be derived from A-PEG-OH include, but are not limited to, those provided by synthesis in the following schemes:

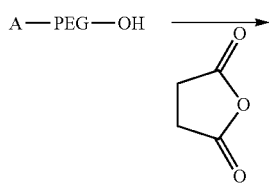

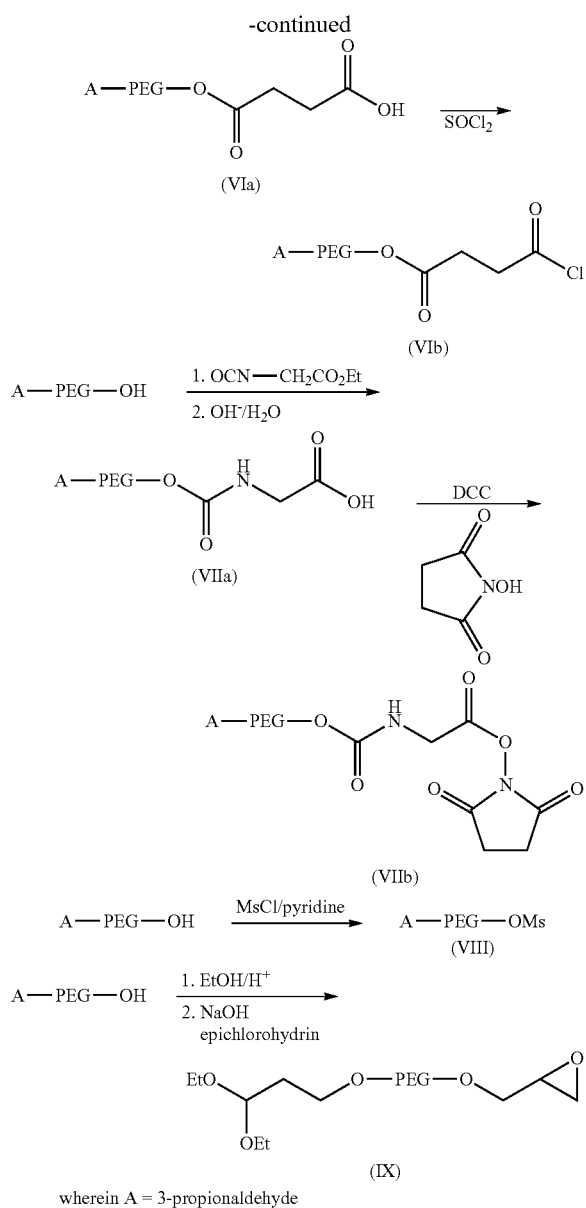

wherein A = 3-propionaldehyde

The chain-extended polyamine products of the invention derived from bifunctional crosslinkers are further characterized by a $M_w$ determined by size exclusion chromatography (SEC) that is at least about 10% higher than the $M_w$ of the multi-arm polyether amines(s) used to make the chain extended polyamine product.

Another embodiment of the invention is a composition of matter made by a process comprising the steps of: (a) reacting, optionally in a second reaction solvent, at least one multi-arm polyether having at least three arms and having at least three electrophilic endgroups with a primary diamine crosslinker of the formula:

$$NH_2—R^2—NH_2$$

the molar ratio of the at least one multi-arm polyether to the primary diamine crosslinker being in the range of about 4:1 to about 50:1, thereby forming a chain-extended polymer having remaining electrophilic endgroups; and, (b) treating, optionally in a third reaction solvent, said chain-extended polymer so as to convert the remaining electrophilic end groups to amine end groups to provide a chain-extended polyamine product; and wherein:

(i) at least three of the arms of said multi-arm polyether are terminated by electrophilic endgroups capable of reacting with a primary amine to form a carbon-nitrogen bond;
(ii) the multi-arm polyether has a weight-average molecular weight of about 450 to about 200,000 Daltons;
(iii) $R^2$ is a divalent polymer group;
(iv) $NH_2—R^2—NH_2$ is a polymer having a weight-average molecular weight of about 2,000 to about 20,000 Daltons;

provided that the chain-extended polyamine product is characterized by a solubility in water at 20° C. of at least 20 wt %.

The primary diamine crosslinker useful in the second embodiment of the invention is an amine-terminated polymer having a weight-average molecular weight of about 2,000 to about 20,000 Daltons. Preferably $R^2$ is a divalent polymer group that is characterized by a high affinity for water, such that the corresponding diol, $HO—R^2—OH$, has at least 1 wt % solubility, and preferably at least 3 wt % solubility, in water at 20 and 38° C.

The divalent polymer group $R^2$ can be in the form of a homopolymer or a block or random copolymer. Preferably $R^2$ is a divalent polymer group derived from repeat units of one or more monomers selected from the group: ethylene oxide, propylene oxide, vinyl acetate, vinyl alcohol, N-vinyl pyrrolidone, and oxetane. A preferred primary diamine crosslinker for the invention comprises a divalent polymer group R selected from the group: divalent homopolymers of ethylene oxide; and divalent block and random copolymers of ethylene oxide and propylene oxide. The hydroxy terminated polymers useful in preparing primary diamine crosslinkers are commercially available as disclosed above. The primary diamine crosslinker can be synthesized using the route outlined for the amine terminated PEG in FIG. 1. For instance, treatment of PEG with thionyl bromide provides the bromide terminated PEG, which can be further treated with ammonia to provide the desired primary diamine crosslinker. Amine terminated PEGs comprising terminal aminopropyl groups, suitable as a primary diamine crosslinkers, also are available from NOF Corporation in a $M_w$ range of 3400 to about 20,000.

The term "multi-arm polyether having at least three arms and having at least three electrophilic endgroups" refers to a branched polyether, having at least three arms that are terminated by electrophilic endgroups, which is water soluble and capable of reacting with a primary diamine crosslinker.

The multi-arm polyether is a polyether having the repeat unit $[—O—R^3]—$, wherein $R^3$ is an hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyethers useful in the invention include dendritic, comb, and star branched and hyperbranched polyethers wherein at least three of the arms are terminated by an electrophilic end group. The multi-arm polyethers have a weight-average molecular weight of about 450 to about 200,000 Daltons, preferably from about 2,000 to about 40,000 Daltons.

The multi-arm polyethers having at least three arms and having at least three electrophilic endgroups are available commercially, as noted below, or may be prepared using methods known in the art. For example, multi-arm polyethylene glycols (PEG), wherein at least three arms are terminated by hydroxyl groups, are available by synthesis according to the methods of Merrill, in *J. Biomater. Sci. Polymer*

Edn, 5, pp. 1-11 (1993). The 3, 4, 6 and 8-arm star PEGs are also available from companies such as Nektar Transforming Therapeutics; SunBio, Inc., Anyang City, South Korea; NOF Corp., Tokyo, Japan; and JenKem Technology USA, Allen, Tex. The multi-arm PEGs can be transformed into multi-arm polyethers having electrophilic endgroups using thionyl bromide and the methods described by Bückmann et al. (*Makromol. Chem.* 182:1379-1384, 1981). In another preferred method, the multi-arm PEGs can be transformed into reactive chlorides using thionyl chloride as disclosed above. The multi-arm PEGs can be transformed to mesylates, tosylates, treslyates or triflates by treatment with methanesulfonyl chloride, toluenesulfonyl chloride, 2,2,2,-trifluoroethanesulfonyl chloride and trifluoromethanesulfonyl chloride, respectively, in an aprotic solvent such as dichloromethane, in the presence of a base, such as triethylamine or pyridine.

Figure 2:
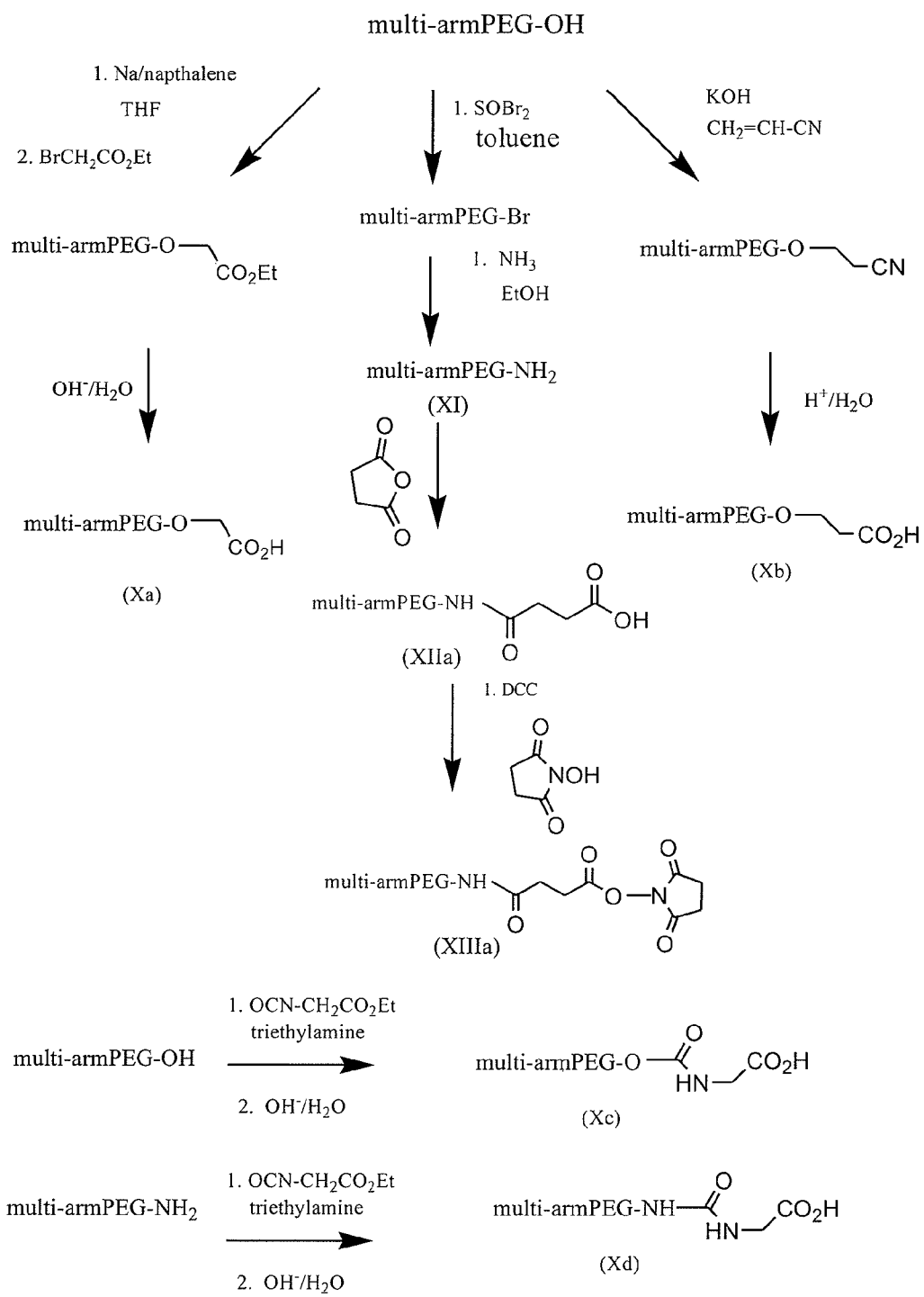
FIG. 2 illustrates synthetic routes for multi-arm polyethers having electrophilic endgroups useful in the invention.

Other preferred multi-arm polyethers having electrophilic endgroups useful in the invention include carboxy terminated multi-arm PEGs having carboxylic acid, carboxylic acid halides, or reactive carboxylate ester terminal groups. These materials are available by synthesis following the routes outlined in FIG. 2, wherein the multi-arm PEG-OH represents a multi-arm PEG having at least three arms, preferably 4 to 8 arms, that are terminated by hydroxyl groups. In the routes, substantially all the terminal hydroxyl groups undergo transformation to the various derivatives indicated. The various pathways useful for preparing carboxy terminated multi-arm PEG polymers are similar to those described for the bifunctional crosslinkers in FIG. 1. For instance, the amine terminated multi-arm PEG can be transformed to a carboxy terminated PEG as exemplified by treatment with succinic anhydride, to provide the carboxy terminated multi-arm PEG (XIIa). Glutaric anhydride, caproic anhydride, adipic anhydride, maleic anhydride and oxybisacetic anhydride can be used instead of succinic anhydride to produce a variety of carboxy terminated multi-arm PEGs. Table 3 lists several carboxy terminated multi-arm PEGs useful in the invention The carboxy terminated multi-arm PEGs of formulas (Xa-d) and (XIIa-e) can be further transformed to acid chlorides or bromides by treatment with thionyl chloride or thionyl bromide, respectively. The carboxy terminated multi-arm PEGs can be further transformed to reactive esters as exemplified by treatment of (XIIa) with dicyclohexylcarbodiimide (DCC) and N-hydroxysuccinimide to provide N-oxy succinimide ester of formula (XIIIa) in FIG. 2. Many other PEG terminated activated esters including 4-nitrophenyl, 2,4-dinitrophenyl, or pentafluorophenyl can be prepared in a similar manner using DCC and 4-nitrophenol, 2,4-dinitrophenol and pentafluorophenol, respectively. Table 4 lists several activated ester terminated multi-arm PEGs useful as bifunctional crosslinkers in the invention.

TABLE 3

| Formula No. | Structure |
|---|---|
| (Xa) | multi-arm PEG-O-CH2-CO2H |
| (Xb) | multi-arm PEG-O-CH2CH2-CO2H |
| (Xc) | multi-arm PEG-O-C(=O)-NH-CH2-CO2H |
| (Xd) | multi-arm PEG-NH-C(=O)-NH-CH2-CO2H |
| (XIIa) | multi-arm PEG-NH-C(=O)-CH2CH2-C(=O)OH |
| (XIIb) | multi-arm PEG-NH-C(=O)-CH2CH2CH2-C(=O)OH |

TABLE 3-continued

| Formula No. | Structure |
|---|---|
| (XIIc) | multi-arm PEG-NH-C(=O)-(CH2)3-C(=O)OH |
| (XIId) | multi-arm PEG-NH-C(=O)-(CH2)4-C(=O)OH |
| (XIIe) | multi-arm PEG-NH-C(=O)-CH=CH-C(=O)OH |

TABLE 4

| Formula No. | Structure |
|---|---|
| (XIIIa) | multi-arm PEG-NH-C(=O)-CH2CH2-CO2-NHS |
| (XIIIb) | multi-arm PEG-NH-C(=O)-(CH2)3-CO2-NHS |
| (XIIIc) | multi-arm PEG-NH-C(=O)-(CH2)3-CO2-NHS |
| (XIIId) | multi-arm PEG-NH-C(=O)-(CH2)4-CO2-NHS |

TABLE 4-continued

| Formula No. | Structure |
|---|---|
| (XIIIe) | multi-arm PEG-NH—C(O)—CH=CH—CO₂—N(succinimidyl) |
| (XIIIf) | multi-arm PEG-O—CH₂—CO₂—(2,4-dinitrophenyl) |
| (XIIIg) | multi-arm PEG-O—CH₂—CO₂—(4-nitrophenyl) |
| (XIIIh) | multi-arm PEG-O—C(O)—NH—CH₂—CO₂—(pentafluorophenyl) |
| (XIIIi) | multi-arm PEG-O—C(O)—NH—CH₂—CO₂—N(succinimidyl) |

Some multi-arm polyethers having electrophilic endgroups are commercially available. For instance, under the SUNBRIGHT® trade name, NOF America Corporation offers a four-arm PEG-tetraglutaryl NHS activated ester, a four-arm PEG-tetracaproate NHS ester, a four-arm PEG tetra-(4-nitrophenyl)carbonate, an 8-arm PEG-octaglutaryl NHS, and an 8-arm PEG-octa-(4-nitrophenyl)carbonate.

Other preferred multi-arm polyethers having electrophilic endgroups useful in the invention include aldehyde terminated multi-arm PEGs. For instance, a multi-arm PEG-OH can be treated with sodium naphthalene in THF followed by alkylation with 2-bromoacetaldehyde diethyl acetal and hydrolysis of the acetal to provide acetaldehyde terminated multi-arm PEG. In similar fashion 3-bromopropionaldehyde diethyl acetal can be used to provide propionaldehyde terminated multi-arm PEG.

In a preferred embodiment, within the multi-arm polyethers having electrophilic endgroups, the electrophilic endgroups are selected from the group: —OMs, —OTs, —OTf, tresylate, Cl, Br, and I; and step (b) comprises reacting the chain-extended polymer with sufficient ammonia to provide a chain-extended polyamine product. A preferred third reaction solvent for this embodiment is selected from C1 to C6 aliphatic alcohols, and a most preferred solvent is ethanol. The chain-extended polyamine product, in this embodiment, and all other embodiments discussed herein, encompasses product that is fully neutralized with base, partially neutralized with base, or fully protonated forming an ammonium salt. The extent of neutralization of the chain-extended polyamine product is a function of the pH of the solution from which it is derived, and whether salts are removed by dialysis or other washing techniques, all of which are within the scope of the invention. For instance, the chain-extended polyamine product, if so desired, may be in the presence of a large excess of ammonia, and further treatment by dialysis may remove substantially all of the ammonium salt by-product.

In another preferred embodiment, within the multi-arm polyethers having electrophilic endgroups, the electrophilic endgroups are selected from the group: —OMs, —OTs, —OTf, tresylate, Cl, Br, and I; and step (b) comprises the steps of: (i) reacting the chain-extended polymer with an alkali metal azide to provide a chain-extended azido polymer; and (ii) reducing the chain-extended azido polymer with a reducing agent to provide a chain-extended polyamine product. The reducing agent can be any one or more agents known to be useful in converting an organic azide into a primary amine including those selected from the group consisting of: hydrogen and a metal catalyst selected from the group consisting of: Pt, Pd, PtO₂, PdCl₂, and Raney nickel; triphenylphosphine; lithium aluminum hydride; borohydrides selected from the group consisting of: sodium borohydride, zinc borohydride, and lithium aminoborohydride wherein the amine is selected from the group consisting of diethylamine, diisopropylamine, pyrrolidine, piperidine, and morpholine; metal and metal salts selected from the group consisting of zinc and tin (II) chloride; and ammonium formate. A preferred third reaction solvent for step (i) is a polar aprotic solvent such as N,N-dimethylformamide or N,N-dimethylacetamide. The alkali metal azide is preferably sodium azide. The metal catalyst, if used, is preferably dispersed on charcoal or silica. The metal catalyst or other remaining reducing agents are desirably removed after the reducing step is complete. This embodiment can provide a chain-extended polyamine product that is substantially free of ammonium salt.

In another preferred embodiment, within the multi-arm polyethers having electrophilic endgroups, the electrophilic endgroups are carboxylic acids; step (a) further comprises a diimide dehydrating agent; and step (b) comprises a Hofmann type rearrangement comprising the steps of: (i) reacting the chain-extended polymer with sufficient amount of acid halide reagent to provide a chain extended acid halide polymer; (ii) reacting the chain extended acid halide polymer with sufficient ammonia to provide a chain extended primary amide polymer; and (iii) reacting the chain extended primary amide polymer with sufficient active halogen source and an alkali metal hydroxide to provide a chain-extended polyamine product; as illustrated in the following scheme:

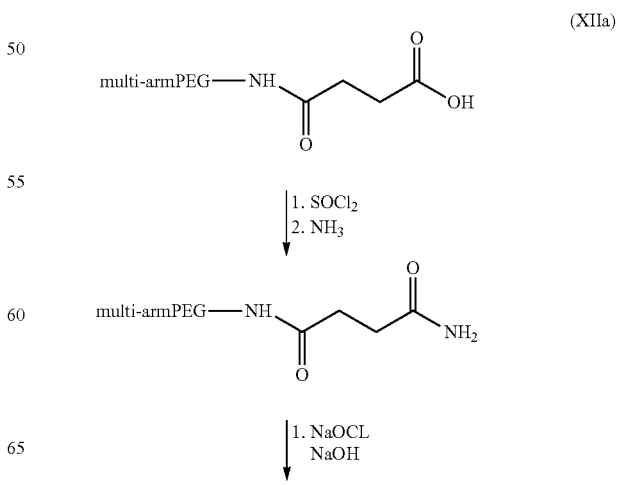

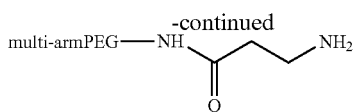

Within this embodiment, the diimide dehydrating agent used in step (a) is preferably dicyclohexylcarbodiimide. In Step (i): the acid halide reagent is any acid chloride typically useful in converting a carboxylic acid to a carboxylic acid chloride, and preferably is selected from the group: thionyl chloride, thionyl bromide, oxalyl chloride, and phosphorous oxychloride; and step (i) is typically performed in an aprotic solvent, such as toluene, THF or dichloromethane. In step (iii): the active halogen source is any source of electrophilic chlorine or bromine, and preferably is selected from the group consisting of: chlorine, bromine, sodium hypochlorite, sodium hypobromite, potassium hypochlorite, potassium hypobromite, N-chlorosuccinimide, and N-bromosuccinimide. Other sources of electrophilic chlorine or bromine such as (diacetoxyiodo)benzene and [bis(trifluoroacetoxy)iodo]benzene, also are useful. The alkali metal hydroxide is preferably selected from the group consisting of: sodium hydroxide, potassium hydroxide, and lithium hydroxide. Preferably step (iii) is performed in a solvent. A preferable solvent is water.

In another preferred embodiment, within the multi-arm polyethers having electrophilic endgroups, the electrophilic endgroups are carboxylic acids; step (a) further comprises a diimide dehydrating agent; and step (b) comprises a Curtius type rearrangement comprising the steps of: (i) reacting the chain-extended polymer with sufficient amount of acid halide reagent to provide a chain extended acid halide polymer; (ii) reacting the chain extended acid halide polymer with sufficient alkali metal azide to provide a chain extended acyl azide polymer, and (iii) heating the chain-extended acyl azide polymer, preferably in a protic solvent such as water, to induce rearrangement to provide a chain-extended polyamine product; as illustrated in the following scheme:

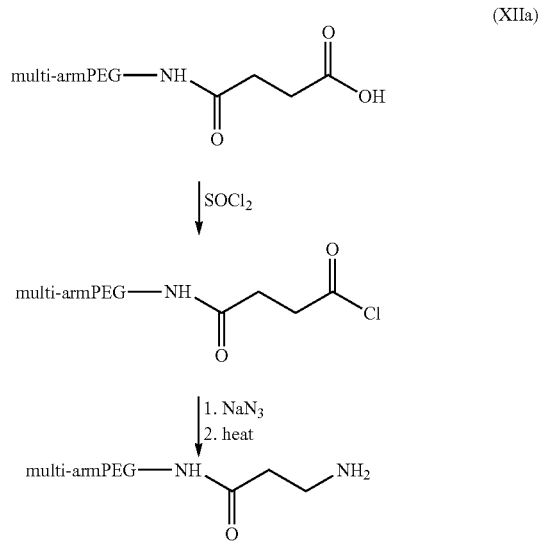

(XIIa)

In step (ii): the alkali metal azide is preferably sodium azide; and preferably, a polar aprotic solvent is used such as THF or acetonitrile. In step (iii): preferably a protic solvent such as water is used and heating is preferably to about 70 to 100° C.

In another preferred embodiment, within the multi-arm polyethers having electrophilic endgroups, the electrophilic endgroups are activated carboxylic esters or carboxylic acid chlorides; and step (b) comprises a Hofmann type rearrangement comprising the steps of: (i) reacting the chain-extended polymer with sufficient ammonia to provide a chain-extended primary amide polymer; and (ii) reacting the chain extended primary amide polymer with sufficient active halogen source and an alkali metal hydroxide to provide a chain-extended polyamine product.

In another preferred embodiment, within the multi-arm polyethers having electrophilic endgroups, the electrophilic endgroups are activated carboxylic esters or carboxylic acid halides; and step (b) comprises a Curtius type rearrangement comprising the steps of: (i) reacting the chain extended polymer with sufficient alkali metal azide to provide a chain-extended acyl azide polymer, and (ii) heating the chain-extended acyl azide polymer, preferably in a protic solvent such as water, to induce rearrangement to provide a chain-extended polyamine product. Suitable carboxylic acid halides include carboxylic acid fluorides, chlorides, bromides and iodides. Preferred carboxylic acid halides are carboxylic acid chlorides.

In another preferred embodiment, within the multi-arm polyethers having electrophilic endgroups, the electrophilic endgroups are aldehydes, and step (b) comprises the steps of: (i) reacting the chain-extended polymer with sufficient ammonia to provide a chain-extended imine polymer; and (ii) reducing the chain-extended imine polymer to provide a chain-extended polyamine product; as illustrated in the following scheme:

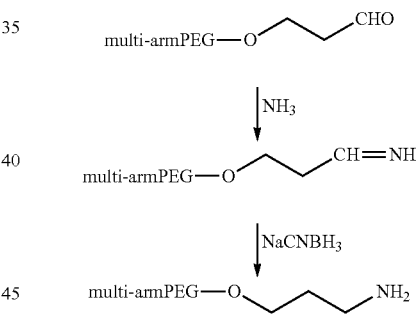

Step (i) is preferably performed in a protic solvent such as ethanol; and an acid catalyst such as hydrochloric acid may be present if desired. Step (ii) can be performed with a hydride reducing agent such as sodium triacetoxyborohydride, sodium cyanoborohydride and the like. Alternatively, step (ii) can be performed with a metal catalyst and hydrogen gas. The metal catalyst can be a noble metal including Pt, PtCl$_4$, PtO$_2$, Pd, and the like, preferably on a support such as carbon black or silica. The metal catalyst also can be Raney nickel or other transition metal catalysts known to reduce carbon nitrogen double bonds to primary amines. Step (ii) is preferably performed in a protic solvent such as ethanol, methanol, water, and the like.

The chain-extended polyamine product of the invention derived from the primary diamine crosslinker is further characterized by an $M_w$ determined by size exclusion chromatography (SEC) that is at least about 10% higher than the $M_w$, of the multi-arm polyether used to make the chain extended polyamine product. The chain-extended polyamine product of the invention is useful in formulating polymer tissue adhesives. The polymer tissue adhesives are formed by reacting an oxidized polysaccharide with the chain-extended polyamine product of the invention in a manner similar to that described by Kodokian et al. in US 2006/0078536 A1, which is incorporated herein by reference. The tissue adhesives derived from the chain-extended polyamines of the invention generally exhibit an increased elasticity and improved stability in aqueous environments, as compared to formulations without the chain-extended polyamine product, as demonstrated in Table 5 and 7, respectively.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "h" means hour(s), "mL" means milliliter(s), "L" means liter(s), "µL" means microliter(s), "mol" means mole(s), "mmol" means millimole(s), "g" means gram(s), "mg" means milligram(s), "mm" means millimeter(s), "Pa" means pascal(s), "kPa" means kilopascal(s), "psig" means pounds per square inch gauge, "wt %" means percent by weight, "PEG" means poly(ethylene glycol)", "MW" means nominal molecular weight, "$M_w$" means weight-average molecular weight, "$M_n$" means number-average molecular weight, "$M_z$" means z-average molecular weight, "dn/dc" means the specific refractive index increment (i.e., the change in refractive index per change in concentration), "IV" means intrinsic viscosity, "MHz" means megahertz, "SEC" means size exclusion chromatography, "PBS" means phosphate buffered saline, "$^1$H NMR" means proton nuclear magnetic resonance spectroscopy, "DMSO-$d_6$" means deuterated dimethylsulfoxide, "Ac" means an acetate group, and "RT" means room temperature.

General Methods:
Reagents:
Dextran (MW=10,000) was purchased from Sigma-Aldrich (St Louis, Mo.). The 8-arm PEG amine (MW=10,000), having eight arms terminated by a primary amine group was purchased from Nektar Transforming Therapeutic (Huntsville, Ala.). Sodium periodate (99% purity, CAS No. 7790-28-5) was purchased from Acros Organics (Morris Plains, N.J.). All other reagents were obtained from Sigma-Aldrich unless otherwise noted.

Preparation of Oxidized Dextran:
The following procedure, similar to that disclosed in Azzam, T.; Raskin, A.; Makovitzki, A.; Brem, H.; Vierling, P.; Lineal, M.; Domb, A. J. *Macromolecules* 2002, 35, 9947-9953, was used to prepare a dextran dialdehyde with about 48% aldehyde content conversion from dextran having a molecular weight of 10,000 Daltons. Similar procedures were used for dextrans having molecular weights of 40,000, 60,000, and 250,000 Daltons. Other aldehyde conversions were obtained by varying the concentration of the periodate solution used, as noted below.

Dextran (18.9 g) was added to 170.1 g of distilled water (to give a 10 wt % aqueous solution) in a 500 mL round bottom flask. The solution was stirred for 15 to 30 min. Then, 17.6 g of NaIO$_4$ in 158.4 g of distilled water (10-wt % aqueous solution) was added to the dextran solution. The concentration of the periodate solution may be varied depending on the aldehyde conversion desired. The mixture was stirred at room temperature for 5 h. After this time, the solution was removed from the round bottom flask, divided into four equal volumes and dispensed into 4 dialysis membrane tubes (MEMBRA-CEL™ Dialysis Tubing, molecular weight cut-off of 3500 Daltons, obtained from Viskase Companies, Inc., Willowbrook, Ill.). For dextran having a molecular weight of 40,000, 60,000, and 250,000 Daltons, a 14,000 Dalton cut-off dialysis membrane tube (Viskase Companies, Inc.) was used. The dialysis tubes were inserted into a 5 L flask containing 4.5 L of distilled water and dialyzed for up to 4 days. During this dialysis, the distilled water was changed after 2 days. The samples were removed from the dialysis membrane tubes and placed into a lyophilizer container. The samples were frozen using liquid nitrogen and placed into a lyophilizer for 24 to 48 h or until all the water was evaporated.

The dialdehyde content in the resulting oxidized dextran was determined using the following procedure. The oxidized dextran (0.1250 g) was added to 10 mL of 0.25 M NaOH in a 250 mL Erlenmeyer flask. The mixture was gently swirled and then placed in a temperature-controlled sonicator bath at 40° C. for 5 min until all the material dissolved, giving a dark yellow solution. The sample was removed from the bath and immediately cooled under cold tap water for 5 min. Then, 15.00 mL of 0.25 M HCl was added to the solution, followed by the addition of 50 mL of distilled water and 1 mL of 0.2% phenolphthalein solution. This solution was titrated with 0.25 M NaOH using a 50 mL burette and the endpoint was determined by a color change from yellow to purple/violet.

The dialdehyde content, also referred to herein as the oxidation conversion, in the oxidized dextran sample was calculated using the following formula:

$$\text{Dialdehyde Content} = \frac{(Vb - Va)_s}{W_s/M} - \frac{(Vb - Va)_p}{W_p/M} \times 100(\%)$$

Vb=total meq of base
Va=total of meq of acid
W=dry sample weight (mg)
M=molecular weight of repeating unit=162
S=the oxidized sample
P=the original sample Synthesis of an 8-Arm Star PEG Chloride, MW 10,000
The 8-arm star PEG chloride was prepared by reacting an 8-arm star PEG-OH with thionyl chloride in the absence of a solvent in the following manner:

Eight-arm star PEG-OH, MW10,000 (determined by hydroxyl end group titration assuming all the polymer molecules have eight arms), was obtained from NOF America Corp. (White Plains, N.Y.). The 8-arm star PEG-OH (100 g in a 500-mL round-bottom flask) was dried either by heating with stirring at 85° C. under vacuum (0.06 mm of mercury (8.0 Pa)) for 4 h or by azeotropic distillation with 50 g of toluene under reduced pressure (15 mm of mercury (2 kPa)) with a pot temperature of 60° C.

The 8-arm star PEG-OH was allowed to cool to room temperature. Then, thionyl chloride (35 mL, 0.48 mol) was added to the flask, which was equipped with a reflux condenser, and the mixture was heated at 85° C. with stirring under a blanket of nitrogen for 24 h. Excess thionyl chloride was removed by rotary evaporation (bath temp 40° C.). Two successive 50-mL portions of toluene were added and evaporated under reduced pressure (15 mm of mercury (2 kPa), bath temperature 60° C.) to complete the removal of thionyl chloride. The yield of 8-arm star PEG-Cl was 100.9 g (99%).

$^1$H NMR (500 MHz, DMSO-$d_6$): δ 3.71-3.69 (m, 16H), 3.67-3.65 (m, 16H), 3.50 (s, ~800H). Aqueous SEC with mass analysis by light scattering [30° C., PBS (10 mM phosphate, 2.7 mM KCl, 0.137 M NaCl, pH 7.4), 0.5 mL/min, two Suprema Linear M mixed-bed columns (Polymer Standards Services, Silver Springs, Md.), dn/dc 0.135 mL/g] gave $M_w$ 7,100, $M_w/M_n$ 1.2, $M_z/M_w$ 1.2, and IV 9.1 mL/g.

The end group conversion was determined to be 99% by acetylation of residual hydroxyl end groups and analysis by $^1$H NMR as follows. A sample of 8-arm star PEG-Cl (0.2 g) was dissolved in a mixture of 0.25 mL of acetic anhydride and 0.35 mL of pyridine and left at ambient temperature overnight. The reaction was quenched by addition of 5 g of ice. The aqueous layer was extracted with three 3-mL portions of chloroform, and the combined chloroform extracts were washed successively with three 1-mL portions of 20% aqueous sodium bisulfate, two 1-mL portions of saturated aqueous sodium bicarbonate, and 1 mL of water. The chloroform was evaporated under reduced pressure. The residue was dissolved in 2 mL of water, and the resulting cloudy solution was concentrated until clear under reduced pressure to remove residual chloroform. The solution was frozen and lyophilized, and the residue was dissolved in DMSO-$d_6$ and analyzed by $^1$H NMR.

The proportion of residual hydroxyl end groups in the 8-arm star PEG-Cl was determined by comparing the integrals of the $^1$H NMR peaks for the —CH$_2$OAc end groups [δ 4.09 (t, J=4.7 Hz, 2H, CH$_2$OAc) and 2.00 (s, 3H, AcO)] with that of the CH$_2$Cl end groups [δ 3.72-3.68 (m, 2H, CH$_2$Cl)].

Example 1

This Example illustrates the synthesis of 8-Arm PEG-Amine, MW 10,000.

Eight-arm PEG-OH, MW 10,000, (Nektar Transforming Therapeutics, 100 g) was dried by heating, with stirring, at 85° C. under vacuum (0.06 torr) for 4 to 16 h. The dried 8-arm PEG was cooled to room temperature (RT), thionyl chloride (35 mL, 0.48 mol) was added, and the mixture was heated at 85° C. with stirring under a blanket of nitrogen for 20 h. Excess thionyl chloride was removed to provide 8-arm PEG-Cl: $^1$H NMR (500 MHz, DMSO-$d_6$) δ 3.71-3.69 (m, 16H), 3.67-3.65 (m, 16H), 3.50 (s, ~800H); aqueous SEC with mass analysis by light scattering [30° C., phosphate buffered saline (PBS, 10 mM phosphate, 2.7 mM KCl, 0.137 M NaCl, pH 7.4), 0.5 mL/min, two mixed-bed columns (Polymer Standards Services Suprema Linear M), do/dc 0.135 mL/g] gave $M_w$ 7.100, $M_w/M_n$ 1.2, $M_z/M_w$ 1.2, and intrinsic viscosity (IV) of 9.1 mL/g.

The 8-arm PEG-Cl (100.9 g) was dissolved in 640 mL of concentrated aqueous ammonia (28% w/w) and heated in a sealed vessel at 60° C. for 48 h, resulting in a developed pressure of about 40 psig (276 kPa). The solution was cooled to RT and sparged for 2 h with dry nitrogen to drive off about 50 to 70 g of ammonia. The solution was passed through a column of anion exchange resin (Purolite® A-860, The Purolite Co., Bala-Cynwyd, Pa.) in the hydroxide form. The eluant was collected and concentrated under reduced pressure to about 200 g, frozen in portions and lyophilized to provide 8-Arm PEG-Amine, MW 10,000: $^1$H NMR (500 MHz, DMSO-$d_6$) δ 3.50 (m, ~800H), 3.34 (t, J=5.8 Hz, 16H), 2.62 (t, J=5.8 Hz, 16H); aqueous SEC with mass analysis by light scattering (conditions as stated above) gave $M_w$ 10,300, $M_w/M_n$ 1.5, $M_z/M_w$ 1.7, IV 11 mL/g. Treatment of the 8-arm PEG-NH$_2$, MW 10,000, with excess acetic anhydride in pyridine and examination of the product by $^1$H NMR indicated an overall 99% conversion of —OH endgroups to —NH$_2$ endgroups.

Example 2

This Example illustrates the synthesis of 8-Arm PEG-Amine, MW 2,000.

To a solution of 60 g of 8-arm PEG-OH, MW 2,000 (Nektar Transforming Therapeutics), triethylamine (69 mL) and of dichloromethane (1.5 L), cooled to 0° C., was added methanesulfonyl chloride (37.5 mL). The mixture was stirred at RT for 16 h, concentrated under reduced pressure (15 torr, 40° C.) to 600 mL, and washed successively three times with 1.0 M potassium dihydrogen phosphate (300 mL), once with saturated potassium carbonate (300 mL), and once with water (300 mL). The dichloromethane layer was dried (magnesium sulfate), filtered, and concentrated (15 torr, bath temperature 40° C.) to provide eight-arm PEG methanesulfonate (90% yield): $^1$H NMR (500 MHz, DMSO-$d_6$) δ 4.29 (m, 16H), 3.66 (m, 16H), 3.50 (m, ~130H), 3.16 (s, 24H); aqueous SEC with mass analysis by light scattering (as in Example 1) gave $M_w$ 1,700, $M_w/M_n$ 1.0, $M_z/M_w$ 1.0, and IV 9.1 mL/g.

The 8-arm PEG methanesulfonate ester (22 g) was dissolved in 536 mL of concentrated aqueous ammonia (28% w/w) and stirred in a sealed vessel at RT for 48 h. The solution was sparged for 4 h with dry nitrogen to drive off >50 g of ammonia, concentrated (15 torr, 60° C.) to about 200 g, made basic with 10 g of potassium carbonate, and extracted 3 times with 100 mL portions of chloroform. The combined chloroform extract was dried (magnesium sulfate), filtered, and concentrated (15 torr, 40° C.). The residue was taken up in 300 mL of dichloromethane, filtered to remove insolubles, and concentrated (15 torr, 40° C.), and dried (0.06 torr) to give 8-arm PEG-NH$_2$, MW 2,000: $^1$H NMR (500 MHz, DMSO-$d_6$) δ 3.51 (m, ~130H), 3.35 (t, J=5.8 Hz, 16H), 2.63 (t, J=5.8 Hz, 16H).

Example 3

This Example illustrates the synthesis of 6-Arm PEG-Amine, MW 10,000.

Six-arm PEG-OH, MW 10,000, (SunBio, Inc., Orinda, Calif.; 50 g) was dried by heating with stirring at 90° C. (0.1 torr) for 16 h. The dried 6-arm PEG was cooled to RT, thionyl chloride (13 mL, 0.18 mol) was added, and the mixture heated at 90° C. with stirring under a blanket of nitrogen for 16 h. Excess thionyl chloride was removed by rotary evaporation (40° C.). Two successive 25-mL portions of toluene were added and evaporated under reduced pressure (15 torr, 60° C.) to complete the removal of thionyl chloride. The product was dried at 90° C. with stirring (0.06 torr) to provide 6-arm PEG-Cl (49.0 g, 97% yield): $^1$H NMR (500 MHz, DMSO-$d_6$) δ 3.71-3.69 (m, 12H), 3.67-3.65 (m, 12H), 3.50 (s, ~620H); aqueous SEC with mass analysis by light scattering (as in Example 1) gave $M_w$ 7,300, $M_w/M_n$ 1.2, $M_z/M_w$ 1.1, and IV 9.9 mL/g.

The 6-arm PEG-Cl (48.9 g) was dissolved in 232 mL of concentrated aqueous ammonia (28% w/w) and heated in a sealed vessel at 60° C. for 48 h. The solution was sparged for 2 h with dry nitrogen and then concentrated by rotary evaporation (15 torr, 60° C.) to about 160 g. The solution was then passed through a column (450 mL bed volume) of strongly basic anion exchange resin (Purolite® A-860) in the hydroxide form. The eluant was collected, and three 200-mL portions of de-ionized water were passed through the column and collected. The aqueous fractions were combined, concentrated (15 torr, 60° C.) to about 130 g, frozen in portions and lyophilized to give 6-Arm PEG-Amine, MW 10,000 (46.6 g, 96% yield): $^1$H NMR (500 MHz, DMSO-d$_6$) δ 3.50 (m, ~700H), 3.34 (t, J=5.8 Hz, 12H), 2.63 (t, J=5.8 Hz, 12H); aqueous SEC with mass analysis by light scattering (as in Example 1) gave M$_w$ 10,000, M$_w$/M$_n$ 1.3 M$_z$/M$_w$ 1.4 IV 5.7 mL/g.

Example 4

This Example illustrates the synthesis of 4-Arm PEG-Amine, MW 2,000.

Four-arm PEG-OH, MW 2,000, (NOF America, 100 g) was added to 88 mL (1.2 mol) of thionyl chloride chilled to −78° C. The stirred mixture was warmed to RT and then heated at 60° C. under a blanket of nitrogen for 20 h. Excess thionyl chloride was removed by rotary evaporation (40° C.), and two successive 50-mL portions of toluene were added and evaporated under reduced pressure (15 torr, 60° C.) to complete the removal of thionyl chloride. The product was dried at RT with stirring (0.06 torr) to provide 4-arm PEG-Cl: NMR (500 MHz, DMSO-d$_6$) δ 3.72-3.68 (m, 8H), 3.68-3.64 (m, 8H), 3.58-3.44 (m, ~170H), 3.31 (s, 8H).

The 4-arm PEG-Cl (100 g) was heated with 1000 g of anhydrous ammonia in a sealed vessel at 60° C. for 48 h (developed pressure 360 psig). The reaction mixture was cooled to RT, and excess ammonia was allowed to evaporate. The resulting residue was dissolved in about 700 mL of de-ionized water. The resulting solution was passed through a column of anion exchange resin (Purolite® A-860, The Purolite Co., Bala-Cynwyd, Pa.) in the hydroxide form. The eluant was collected and concentrated under reduced pressure to give 4-Arm PEG-Amine, MW 2,000: $^1$H NMR (500 MHz, CDCl$_3$) δ 3.70-3.47 (m, ~170H), 3.45 (t, J=5.2 Hz, 8H), 3.35 (s, 8H), 2.80 (m, 8H); aqueous SEC with mass analysis by light scattering (conditions as stated above) gave M$_w$ 2,400, M$_w$/M$_n$ 1.4, M$_z$/M$_w$ 1.5, IV 2 mL/g.

Example 5

This Example illustrates the synthesis of a bifunctional crosslinker PEG 4000 dimesylate.

To PEG (20 g, MW 4,000) dissolved in 140 mL of dichloromethane were added 2.9 mL of triethylamine and 1.6 mL of methanesulfonyl chloride. The mixture was stirred at RT, diluted with 200 mL of chloroform, washed with 3×100 mL of 1 M potassium dihydrogen phosphate followed by 100 mL of saturated potassium carbonate, dried (magnesium sulfate), filtered, and evaporated (15 torr, 40° C.). The product was dried (0.06 torr) to provide PEG 4000 dimesylate (9.8 g, 95% yield): $^1$H NMR (500 MHz, DMSO-d$_6$) δ 4.29 (m, 4H), 3.66 (m, 4H), 3.50 (m, ~360H), 3.16 (s, 6H); aqueous SEC with mass analysis by light scattering (as in Example 1) gave M$_w$ 3,700, M$_x$/M$_n$ 1.1, M$_z$/M$_w$ 1.0, and IV 5.1 mL/g.

Example 6

This Example illustrates the synthesis of a bifunctional crosslinker PEG 6000 dimesylate.

To PEG (20 g, MW 6,000) dissolved in 95 mL of dichloromethane were added 1.9 mL of triethylamine and 1.0 mL of methanesulfonyl chloride. The mixture was treated in a manner similar to Example 5 to provide PEG 4000 dimesylate (17.4 g, 85% yield): $^1$H NMR (500 MHz, DMSO-d$_6$) δ 4.29 (m, 4H), 3.64 (m, 4H), 3.55 (m, ~580H), 3.15 (s, 6H); aqueous SEC with mass analysis by light scattering (as in Example 1) gave M$_w$ 4,900, M$_w$/M$_n$ 1.1, M$_z$/M$_w$ 1.1, and IV 6.5 mL/g.

Example 7

This Example illustrates the synthesis of a bifunctional crosslinker PEG 8000 dimesylate.

To PEG (20 g, MW 8,000) dissolved in 70 mL of dichloromethane were added 1.5 mL of triethylamine and 0.8 mL of methanesulfonyl chloride. The mixture was treated in a manner similar to Example 5 to provide PEG 8000 dimesylate (16.4 g, 80% yield): $^1$H NMR (500 MHz, DMSO-d$_6$) δ 4.29 (m, 4H), 3.64 (m, 4H), 3.55 (m, ~700H), 3.15 (s, 6H); aqueous SEC with mass analysis by light scattering (as in Example 1) gave M$_w$ 6,900, M$_w$/M$_n$ 1.1, M$_z$/M$_w$ 1.1, and IV 8.2 mL/g.

Example 8

This Example illustrates the synthesis of a bifunctional crosslinker PEG-PPG-PEG, MW 1850, dimesylate.

To Pluronic® L43 (10 g, MW 1850) dissolved in 200 mL of dichloromethane were added 6.0 mL of triethylamine and 3.3 mL of methanesulfonyl chloride. The mixture was treated in a manner similar to Example 5 to provide PEG-PPG-PEG MW 1850 dimesylate (9.0 g, 83% yield): $^1$H NMR (500 MHz, DMSO-d$_6$) δ 4.29 (m, 4H), 3.66 (m, 4H), 3.50 (m, ~116H), 3.16 (s, 6H), 1.03 (d, J=5.9 Hz, ~75H); SEC in THF with mass analysis by light scattering [30° C., 0.5 mL/min, dn/dc 0.060 mL/g] gave M$_w$ 2,000, M$_w$/M$_n$ 1.1, M$_z$/M$_w$ 1.1, and IV 7.9 mL/g.

Example 9

This Example illustrates the synthesis of a bifunctional crosslinker PEG-PPG-PEG, MW 2200, dimesylate.

According to the method of Example 8, 10 g of Pluronic® L44 (MW 2200) was reacted in 200 mL of dichloromethane with 4.9 mL of triethylamine and 2.7 mL of methanesulfonyl chloride to give, after work-up, 8.8 g (82% yield). $^1$H NMR (500 MHz, DMSO-d$_6$): δ 4.28 (m, 4H), 3.67 (m, 4H), 3.50 (m, ~146H), 3.16 (s, 6H), 1.03 (d, J=6.1 Hz, ~66H). SEC in THF with mass analysis by light scattering [30° C., 0.5 mL/min, dn/dc 0.060 mL/g] gave M$_w$ 2,400, M$_w$/M$_n$ 1.1, M$_z$/M$_w$ 1.1, and IV 7.9 mL/g.

Example 10

This Example illustrates the synthesis of a bifunctional crosslinker PEG-PPG-PEG, MW 4200, dimesylate.

According to the method of Example 8, 20 g of Pluronic® P84 was reacted in 135 mL of dichloromethane with 2.7 mL of triethylamine and 1.5 mL of methanesulfonyl chloride to give, after work-up with 25-mL portions of 1 M potassium dihydrogen phosphate and saturated potassium carbonate, 20.4 g (99% yield). $^1$H NMR (500 MHz, DMSO-d$_6$): δ 4.29 (m, 4H), 3.66 (m, 4H), 3.50 (m, ~260H), 3.16 (s, 6H), 1.03 (d, J=5.9 Hz, ~130H). SEC in THF with mass analysis by light scattering [30° C., 0.5 mL/min, dn/dc 0.060 mL/g] gave M$_w$ 4,300, M$_w$/M$_n$ 1.1, M$_z$/M$_w$ 1.1, and IV 12 mL/g.

Example 11

This Example illustrates the synthesis of a bifunctional crosslinker PEG-PPG-PEG, MW 4400, dimesylate.

According to the method of Example 8, 20 g of Pluronic® L121 was reacted in 130 mL of dichloromethane with 2.7 mL of triethylamine and 1.5 mL of methanesulfonyl chloride to give, after work-up with 50-mL portions of 1 M potassium dihydrogen phosphate and saturated potassium carbonate, 19.2 g (93% yield). $^1$H NMR (500 MHz, DMSO-d$_6$): δ 4.29 (m, 4H), 3.66 (m, 4H), 3.50 (m, ~230H), 3.16 (s, 6H), 1.03 (d, J=5.9 Hz, ~180H). SEC in THF with mass analysis by light scattering [30° C., 0.5 mL/min, dn/dc 0.060 mL/g] gave M$_w$ 3,800, M$_w$/M$_n$ 1.1, M$_z$/M$_w$ 1.1, and IV 13 mL/g.

Example 12

This Example illustrates the synthesis of a bifunctional crosslinker PEG-PPG-PEG, MW 5750, dimesylate.

According to the method of Example 8, 20 g of Pluronic® P123 was reacted in 100 mL of dichloromethane with 2.0 mL of triethylamine and 1.1 mL of methanesulfonyl chloride to give, after work-up with 35-mL portions of 1 M potassium dihydrogen phosphate and saturated potassium carbonate, 17.1 g (83% yield). $^1$H NMR (500 MHz, DMSO-d$_6$): δ 4.29 (m, 4H), 3.66 (m, 4H), 3.50 (m, ~300H), 3.16 (s, 6H), 1.03 (d, J=5.9 Hz, ~194H). SEC in THF with mass analysis by light scattering [30° C., 0.5 mL/min, dn/dc 0.060 mL/g] gave M$_w$ 4,900, M$_w$/M$_n$ 1.1, M$_z$/M$_w$ 1.1, and IV 15 mL/g.

Example 13

This Example illustrates the synthesis of a bifunctional crosslinker PEG-PPG-PEG, MW 5900, dimesylate.

According to the method of Example 8, 20 g of Pluronic® P104 was reacted in 100 mL of dichloromethane with 1.9 mL of triethylamine and 1.0 mL of methanesulfonyl chloride to give, after work-up with 30-mL portions of 1 M potassium dihydrogen phosphate and saturated potassium carbonate, 19.0 g (92% yield). $^1$H NMR (500 MHz, DMSO-d$_6$): δ 4.29 (m, 4H), 3.67 (m, 4H), 3.50 (m, ~350H), 3.15 (s, 6H), 1.03 (d, J=5.9 Hz, ~172H). SEC in THF with mass analysis by light scattering [30° C., 0.5 mL/min, dn/dc 0.060 mL/g] gave M$_w$ 5,800, M$_w$/M$_n$ 1.1, M$_z$/M$_w$ 1.1, and IV 14 mL/g.

Example 14

This Example illustrates the synthesis of a bifunctional crosslinker PEG-PPG-PEG, MW 6500, dimesylate.

According to the method of Example 8, 20 g of Pluronic® P105 was reacted in 90 mL of dichloromethane with 1.8 mL of triethylamine and 1.0 mL of methanesulfonyl chloride to give, after work-up with 35-mL portions of 1 M potassium dihydrogen phosphate and saturated potassium carbonate, 17.8 g (87% yield). $^1$H NMR (500 MHz, DMSO-d$_6$): δ 4.29 (m, 4H), 3.67 (m, 4H), 3.50 (m, ~460H), 3.16 (s, 6H), 1.03 (d, J=5.9 Hz, ~170H). SEC in THF with mass analysis by light scattering [30° C., 0.5 mL/min, dn/dc 0.060 mL/g] gave M$_w$ 5,300, M$_w$/M$_n$ 1.1, M$_z$/M$_w$ 1.1, and IV 15 mL/g.

Example 15

This Example illustrates the synthesis of a bifunctional crosslinker PEG-PPG-PEG, MW 6600, dimesylate.

Pluronic F77 (20 g) was mesylated according to the method of Example 14 to give 13.3 g (65% yield). $^1$H NMR (500 MHz, DMSO-d$_6$): δ 4.29 (m, 4H), 3.67 (m, 4H), 3.50 (m, ~520H), 3.16 (s, 6H), 1.03 (d, J=6.1 Hz, ~100H). SEC in THF with mass analysis by light scattering [30° C., 0.5 mL/min, dn/dc 0.060 mL/g] gave M$_w$ 5,500, M$_w$/M$_n$ 1.0, M$_z$/M$_w$ 1.0, and IV 17 mL/g.

Example 16

This Example illustrates the synthesis of a bifunctional crosslinker PEG-PPG-PEG, MW 8400, dimesylate.

According to the method of Example 8, 20 g of Pluronic® F68 was reacted in 70 mL of dichloromethane with 1.4 mL of triethylamine and 0.75 mL of methanesulfonyl chloride to give, after work-up with 25-mL portions of 1 M potassium dihydrogen phosphate and saturated potassium carbonate, 16.9 g (83% yield). $^1$H NMR (500 MHz, DMSO-d$_6$): δ 4.29 (m, 4H), 3.67 (m, 4H), 3.50 (m, ~660H), 3.16 (s, 6H), 1.03 (d, J=6.1 Hz, ~90H). SEC in THF with mass analysis by light scattering [30° C., 0.5 mL/min, dn/dc 0.060 mL/g] gave M$_w$ 8,000, M$_w$/M$_n$ 1.0, M$_z$/M$_w$ 1.0, and IV 18 mL/g.

Example 17

This Example illustrates the synthesis of a bifunctional crosslinker PEG-PPG-PEG, MW 11,400, dimesylate.

According to the method of Example 8, 20 g of Pluronic® F88 was reacted in 50 mL of dichloromethane with 1.0 mL of triethylamine and 0.54 mL of methanesulfonyl chloride to give, after dilution with 150 mL of chloroform and work-up with 15-mL portions of 1 M potassium dihydrogen phosphate and saturated potassium carbonate, 20 g (99% yield). $^1$H NMR (500 MHz, DMSO-d$_6$): δ 4.29 (m, 4H), 3.67 (m, 4H), 3.50 (m, ~1000H), 3.16 (s, 6H), 1.03 (d, J=6.1 Hz, ~120H). SEC in THF with mass analysis by light scattering [30° C., 0.5 mL/min, dn/dc 0.060 mL/g] gave M$_w$ 9,400, M$_w$/M$_n$ 1.0, M$_z$/M$_w$ 1.0, and IV 25 mL/g.

Example 18

This Example illustrates the synthesis of a bifunctional crosslinker PEG-PPG-PEG, MW 14,600, dimesylate.

According to the method of Example 8, 20 g of Pluronic® F108 was reacted in 50 mL of dichloromethane with 0.76 mL of triethylamine and 0.42 mL of methanesulfonyl chloride to give, after dilution with 150 mL of chloroform and work-up with 10-mL portions of 1 M potassium dihydrogen phosphate and saturated potassium carbonate, 20 g (99% yield). $^1$H NMR (500 MHz, DMSO-d$_6$): δ 4.30 (m, 4H), 3.67 (m, 4H), 3.50 (m, ~120011), 3.16 (s, 6H), 1.03 (d, J=6.0 Hz, ~150H). SEC in THF with mass analysis by light scattering [30° C., 0.5 mL/min, dn/dc 0.060 mL/g] gave M$_w$ 13,000, M$_w$/M$_n$ 1.1, M$_z$/M$_w$ 1.1, and IV 31 mL/g.

Example 19

This Example illustrates the synthesis of a bifunctional crosslinker polyoxetane, MW 2,013, dimesylate. Polyoxetane was prepared according to the method described by Sunkara and Ng in U.S. Patent Appl. 2005/0020805 A1.

According to the method of Example 8, 20 g of polyoxetane, MW 2,013, was reacted in 125 mL of dichloromethane with 5.6 mL of triethylamine and 3.1 mL of methanesulfonyl chloride to give, after dilution with 100 mL of chloroform and work-up with 90-mL portions of 1 M potassium dihydrogen phosphate and saturated potassium carbonate, 18.3 g (85% yield). $^1$H NMR (500 MHz, DMSO-d$_6$): δ 4.22 (t, J=6.3 Hz, 4H), 3.37 (m, 120H), 3.13 (s, 6H), 1.88 (quint, J=6.3 Hz, 4H), 1.68 (quint, J=6.3 Hz, 60H). SEC in THF with mass analysis by light scattering [30° C., 0.5 mL/min, dn/dc 0.060 mL/g] gave M$_w$ 2,960, M$_w$/M$_n$ 1.5, M$_z$/M$_w$ 1.4, and IV 11 mL/g.

Example 20

This Example illustrates the preparation of a chain-extended polyamine product derived from an 8-arm PEG amine and a bifunctional crosslinker PEG 6000 dimesylate in a molar ratio of 20:1.

To 1.0 g of 8-arm PEG-amine, MW 10,000 (Example 1), dissolved in 2 mL of DMF and 1 mL of dichloromethane was added 31 mg of PEG 6000 dimesylate (Example 6) dissolved in 1 mL of dichloromethane. After the mixture had stirred at room temperature overnight, it was filtered, diluted with 10 mL of chloroform and washed with 3×2 mL of saturated potassium carbonate. The combined aqueous washes were back-extracted with 1 mL of chloroform. The combined chloroform layers were dried over magnesium sulfate, filtered, and evaporated (15 torr, 40° C.). Water (1-2 g) was added to the residue, giving a cloudy solution, which was concentrated (15 torr, 40° C.) briefly to remove dichloromethane and chloroform. The clarified solution was frozen and lyophilized to give 0.98 g (95% yield). $^1$H NMR (500 MHz, CDCl$_3$) δ 3.59 (m, ~960H), 3.46 (t, J=5.2 Hz, 16H), 2.81 (t, J=5.2 Hz, 14H), 2.76 (t, J=5.5 Hz, 2H). Aqueous SEC with mass analysis by light scattering (as in Example 1) gave $M_w$ 17,860 for the chain-extended polyamine, compared to $M_w$ 13,170 for the 8-arm PEG-amine starting material.

Example 21

This Example illustrates the preparation of a chain-extended polyamine product derived from an 8-Arm PEG-Amine and a bifunctional crosslinker PEG 8000 dimesylate in a molar ratio of 20:1.

According to the method of Example 20, 1.0 g of 8-arm PEG-amine, MW 10,000 (Example 1), was reacted with 41 mg of PEG 8000 dimesylate (Example 7) to give 0.87 g (84% yield). $^1$H NMR (500 MHz, CDCl$_3$) δ 3.58 (m, ~1200H), 3.48 (t, J=5.2 Hz, 16H), 2.82 (t, J=4.8 Hz, 14H), 2.74 (t, J=5.4 Hz, 2H). Aqueous SEC with mass analysis by light scattering (as in Example 1) gave $M_w$ 18,520 for the chain-extended polyamine, compared to $M_w$ 13,170 for the 8-arm PEG-amine starting material.

Example 22

This Example illustrates the preparation of a chain-extended polyamine product derived from an 8-Arm PEG-Amine and a bifunctional crosslinker PEG-PPG-PEG (Pluronic® L43) dimesylate in a molar ratio of 20:1.

According to the method of Example 20, 1.0 g of 8-arm PEG-amine, MW 10,000 (Example 1), was reacted with 10 mg of PEG-PPG-PEG, MW 1850, dimesylate (Example 8) to give 0.87 g (86% yield). $^1$H NMR (500 MHz, CDCl$_3$) δ 3.59 (m, ~854H), 2.85 (m, 14H), 2.76 (m, 2H), 1.09 (m, 2.8H). Aqueous SEC with mass analysis by light scattering (as in Example 1) gave $M_w$ 16,500 for the chain-extended polyamine, compared to $M_w$ 8,730 for the 8-arm PEG-amine starting material.

Example 23

This Example illustrates the preparation of a chain-extended polyamine product derived from an 8-Arm PEG-Amine and a bifunctional crosslinker PEG-PPG-PEG (Pluronic® L44) dimesylate in a molar ratio of 20:1.

According to the method of Example 20, 1.0 g of 8-arm PEG-amine, MW 10,000 (Example 1), was reacted with 12 mg of PEG-PPG-PEG (Pluronic® L44) dimesylate (Example 9) to give 0.85 g (84% yield). $^1$H NMR (500 MHz, CDCl$_3$) δ 3.59 (m, ~754H), 3.50 (t, J=5.2 Hz, 16H), 2.85 (m, 14H), 2.76 (m, 2H), 1.09 (m, 3H). Aqueous SEC with mass analysis by light scattering (as in Example 1) gave $M_w$ 12,600 for the chain-extended polyamine, compared to $M_w$ 8,730 for the 8-arm PEG-amine starting material.

Example 24

This Example illustrates the preparation of a chain-extended polyamine product derived from an 8-Arm PEG-Amine and a bifunctional crosslinker PEG-PPG-PEG (Pluronic® P84) dimesylate in a molar ratio of 20:1.

According to the method of Example 20, 1.0 g of 8-arm PEG-amine, MW 10,000 (Example 1), was reacted with 22 mg of PEG-PPG-PEG (Pluronic® P84) dimesylate (Example 10) to give 0.76 g (74% yield). $^1$H NMR (500 MHz, CDCl$_3$) δ 3.59 (m, ~754H), 3.50 (t, J=5.2 Hz, 16H), 2.85 (t, J=5.1 Hz, 14H), 2.76 (t, H=5.4 Hz, 2H), 1.09 (m, 3H). Aqueous SEC with mass analysis by light scattering (as in Example 1) gave $M_w$ 12,600 for the chain-extended polyamine, compared to $M_w$ 8,730 for the 8-arm PEG-amine starting material.

Example 25

This Example illustrates the preparation of a chain-extended polyamine product derived from an 8-Arm PEG-Amine and a bifunctional crosslinker PEG-PPG-PEG (Pluronic® P123) dimesylate in a molar ratio of 20:1.

According to the method of Example 20, 1.0 g of 8-arm PEG-amine, MW 10,000 (Example 1), was reacted with 29 mg of PEG-PPG-PEG (Pluronic® P123) dimesylate (Example 12) to give 0.91 g (89% yield). $^1$H NMR (500 MHz, CDCl$_3$) δ 3.60 (m, ~934H), 3.47 (t, J=4.8 Hz, 16H), 2.82 (t, J=4.8 Hz, 14H), 2.76 (t, J=5.4 Hz, 2H), 1.09 (m, 10H).

Example 26

This Example illustrates the preparation of a chain-extended polyamine product derived from an 8-Arm PEG-Amine and a bifunctional crosslinker PEG-PPG-PEG (Pluronic® P 104) dimesylate in a molar ratio of 20:1.

To 40 g of 8-arm PEG-amine, MW 10,000 (Example 1), dissolved in 80 mL of DMF and 40 mL of dichloromethane was added 1.22 g of PEG-PPG-PEG (Pluronic® P104) dimesylate (Example 13) dissolved in 40 mL of dichloromethane and the mixture stirred at RT overnight. The mixture was filtered, diluted with 300 mL of chloroform and washed with 3×80 mL of saturated potassium carbonate. The combined aqueous washes were back-extracted with 40 mL of chloroform. The combined chloroform layers were dried (magnesium sulfate), filtered, and evaporated (15 torr, 40° C.). Water (35 g) was added to the residue, giving a cloudy solution, which was concentrated (15 torr, 40° C.) briefly to remove dichloromethane and chloroform. The clarified solution was frozen and lyophilized to give 37.74 g (92% yield). $^1$H NMR (500 MHz, DMSO-d$_6$) δ 3.50 (m, ~880H), 3.35 (t, J=5.8 Hz, 16H), 2.64 (t, J=5.8 Hz, 16H), 1.03 (d, J=6.0 Hz, 8.0H). Aqueous SEC with mass analysis by light scattering (as in Example 1) gave $M_w$ 11,630 for the chain-extended polyamine, compared to $M_w$ 9,990 for the 8-arm PEG-amine starting material.

Example 27

This Example illustrates the preparation of a chain-extended polyamine product derived from an 8-Arm PEG-Amine and a bifunctional crosslinker PEG-PPG-PEG (Pluronic® P105) dimesylate in a molar ratio of 20:1.

According to the method of Example 20, 1.0 g of 8-arm PEG-amine, MW 10,000 (Example 1), was reacted with 33 mg of PEG-PPG-PEG (Pluronic® P105) dimesylate (Example 14) to give 0.97 g (94% yield). $^1$H NMR: (500 MHz, CDCl$_3$) δ 3.58 (m, ~1120H), 2.82 (m, 14H), 2.74 (t, J=5.4 Hz, 2H), 1.08 (m, 9.2H).

Example 28

This Example illustrates the preparation of a chain-extended polyamine product derived from an 8-Arm PEG-Amine and a bifunctional crosslinker PEG-PPG-PEG (Pluronic® F77) dimesylate in a molar ratio of 20:1.

According to the method of Example 20, 1.0 g of 8-arm PEG-amine, MW 10,000 (Example 1), was reacted with 34 mg of PEG-PPG-PEG (Pluronic® F77) dimesylate (Example 15) to give 0.88 g (85% yield). $^1$H NMR: (500 MHz, CDCl$_3$) δ 3.55 (m, ~1040H), 3.44 (t, J=5.3 Hz, 16H), 2.78 (t, J=4.8 Hz, 14H), 2.72 (t, J=5.4 Hz, 2H), 1.05 (m, 5.9H). Aqueous SEC with mass analysis by light scattering (as in Example 1) gave $M_w$ 14,810 for the chain-extended polyamine, compared to $M_w$ 13,170 for the 8-arm PEG-amine starting material.

Example 29

This Example illustrates the preparation of a chain-extended polyamine product derived from an 8-Arm PEG-Amine and a bifunctional crosslinker PEG-PPG-PEG (Pluronic® F68) dimesylate in a molar ratio of 20:1.

According to the method of Example 20, 1.0 g of 8-arm PEG-amine, MW 10,000 (Example 1), was reacted with 43 mg of PEG-PPG-PEG (Pluronic® F68) dimesylate (Example 16) to give 0.56 g (54% yield). $^1$H NMR: (500 MHz, CDCl$_3$) δ 3.59 (m, ~1160H), 3.50 (t, J=5.2 Hz, 16H), 2.85 (t, J=5.2 Hz, 14H), 2.76 (t, J=5.3 Hz, 2H), 1.09 (m, 5.4H). Aqueous SEC with mass analysis by light scattering (as in Example 1) gave $M_w$ 16,550 for the chain-extended polyamine, compared to $M_w$ 13,170 for the 8-arm PEG-amine starting material.

Example 30

This Example illustrates the preparation of a chain-extended polyamine product derived from an 8-Arm PEG-Amine and a bifunctional crosslinker PEG-PPG-PEG (Pluronic® F88) dimesylate in a molar ratio of 20:1.

According to the method of Example 20, 1.0 g of 8-arm PEG-amine, MW 10,000 (Example 1), was reacted with 58 mg of PEG-PPG-PEG (Pluronic® F88) dimesylate (Example 17) to give 1.02 g (96% yield). $^1$H NMR (500 MHz, DMSO-d$_6$): δ 3.50 (m, ~990H), 3.36 (t, J=5.8 Hz, 16H), 2.65 (t, J=5.8 Hz, 16H), 1.03 (d, J=6.0 Hz, 5.7H). Aqueous SEC with mass analysis by light scattering (as in Example 1) gave $M_w$ 14,140 for the chain-extended polyamine, compared to $M_w$ 10,800 for the 8-arm PEG-amine starting material.

Example 31

This Example illustrates the preparation of a chain-extended polyamine product derived from an 8-Arm PEG-Amine and a bifunctional crosslinker PEG-PPG-PEG (Pluronic® F 108) dimesylate in a molar ratio of 20:1.

According to the method of Example 26, 20 g of 8-arm PEG-amine, MW 10,000 (Example 1), was reacted with 1.48 g of PEG-PPG-PEG (Pluronic® F108) dimesylate (Example 18) to give 20.9 g (97% yield). $^1$H NMR (500 MHz, DMSO-d$_6$): δ 3.50 (m, ~1060H), 3.36 (t, J=5.8 Hz, 16H), 2.65 (t, J=5.8 Hz, 16H), 1.03 (d, J=6.0 Hz, 5.71-1). Aqueous SEC with mass analysis by light scattering (as in Example 1) gave $M_w$ 14,820 for the chain-extended polyamine, compared to $M_w$ 10,800 for the 8-arm PEG-amine starting material.

Example 32

This Example illustrates the preparation of a chain-extended polyamine product derived from an 8-Arm PEG-Amine and a bifunctional crosslinker PEG-PPG-PEG (Pluronic® P104) dimesylate in a molar ratio of 8.69:1.

According to the method of Example 20, 1.0 g of 8-arm PEG-amine, MW 10,000 (Example 1), was reacted with 70 mg of PEG-PPG-PEG (Pluronic® P104) dimesylate (Example 13) to give 0.51 g (48% yield). $^1$H NMR (500 MHz, CDCl$_3$): δ 3.59 (m, ~866H), 3.51 (t, J=5.2 Hz, 16H), 2.85 (t, J=5.0 Hz, 14H), 2.75 (t, J=5.4 Hz, 2H), 1.08 (m, 20H). There was no elution by SEC.

Example 33 (Comparative)

Testing of Chain-Extended Polyamines in Adhesives

As a control, a 25 weight % solution of 8-arm PEG-amine, MW 10,000, with no added chain-extended polyamine product was prepared by dissolving 1 weight equivalent of the 8-arm PEG-amine, MW 10,000 into 3 weight equivalents of de-ionized water. Similarly, a 25 wt % solution of dextran dialdehyde, MW 10,000 dextran with 48% aldehyde conversion, prepared as described above in the section entitled "Preparation of oxidized dextran" was prepared in de-ionized water. Double-barreled syringes (MixPac SDL 005-01-50M) were loaded in one barrel with the 25 weight % solution of the dextran dialdehyde and in the other barrel with a 25 weight % solution of 8-arm PEG-amine, MW 10,000, and equipped with static mixing tips (12-step, MixPac ML 2.5-12-DM). An adhesive hydrogel was extruded from each double-barreled syringe onto a sheet of glass so as to form an elongated structure about 6 cm long and 4 to 5 mm in diameter. Samples cured at RT and were tested for elasticity after 1-2 minutes.

Examples 34-44

The following Examples demonstrate that incorporation of chain-extended polyamine product into a PEG-amine component of an adhesive hydrogel generally, but not always, improves the elongation at break of the formed hydrogel.

Solutions (25 weight %) of chain-extended polyamine products from Examples 20, 22-28 and 30-32 were prepared by dissolving 1 weight equivalent of the chain-extended polyamine product into 3 weight equivalents of de-ionized water. Adhesive hydrogels were prepared from these solutions with the same dextran dialdehyde as described in Example 33.

Elongation to break was determined for each formulation and the Comparative Example according to the formula, elongation to break (%)=100×(final length−initial length)/initial length. Results are in Table 5.

TABLE 5

Elongation to break of adhesive hydrogels derived from chain-extended polyamine products and 8-arm PEG amine control.

| Ex. No. | Chain-extended polyamine product | Elongation at break, % |
|---|---|---|
| 33 Comparative | None | 50 |
| 34 | Ex. 22 (Pluronic ® L43)$^a$ | <10 |
| 35 | Ex. 23 (Pluronic ® L44) | 50 |

TABLE 5-continued

Elongation to break of adhesive hydrogels derived from chain-extended polyamine products and 8-arm PEG amine control.

| Ex. No. | Chain-extended polyamine product | Elongation at break, % |
|---|---|---|
| 36 | Ex. 24 (Pluronic ® P84) | 93 |
| 37 | Ex. 25 (Pluronic ® P123) | 78 |
| 38 | Ex. 26 (Pluronic ® P104) | 152 |
| 39 | Ex. 27 (Pluronic ® P105) | 63 |
| 40 | Ex. 28 (Pluronic ® F77) | 118 |
| 41 | Ex. 30 (Pluronic ® F88) | 159 |
| 42 | Ex. 31 (Pluronic ® F108) | 133 |
| 43 | Ex. 20 (PEG 6000) | 85 |
| 44 | Ex. 32 (Pluronic ® P104) | 100 |

[a]The name in parentheses identifies the bifunctional crosslinker, in the form of a dimesylate, used to make the chain-extended polyamine product.

Examples 45-52

In Vitro Swine Uterine Horn Burst Strength

The following Comparative Examples 45, 47, and 50 and Examples 46, 48, 49, 51 and 52 demonstrate that incorporation of chain-extended polyamine product in an adhesive hydrogel does not impair the ability of the formed hydrogel to adhere to tissue.

Double-barreled syringes (MixPac SDL 005-01-50M) were loaded in one barrel with a 25 weight % solution of the same dextran dialdehyde as described in Example 33 and in the other barrel with a 25, 30, or 50 weight % solution of 8-arm PEG-amine, MW 10,000 (as controls), or with the chain-extended polyamine product of the examples, and equipped with static mixing tips (8-step, MixPac ML 2.5-08-SM). A 0.25-inch circular hole was punched out of the wall of a 6 to 8-cm section of clean, fresh swine uterine horn (obtained from a local abattoir), and the wound was sealed by applying approximately 0.4 mL of adhesive hydrogel extruded from the double-barreled syringe. After the adhesive had cured for 2 to 5 minutes, both ends of the section of uterine horn were clamped shut. A 14-gauge syringe needle connected by plastic tubing to a syringe pump (Model No. 22, Harvard Apparatus, Holliston, Mass.) equipped with a pressure meter was inserted through the uterine horn wall into the lumen. The section of uterine horn was submerged in a clear dish of water, and air was pumped by the syringe pump into the intestinal section at 11 mL/h. The pressure at which each sealed wound leaked was noted. The results are given in Table 6. The typical experimental error in these measurements is at least +/−20%. Thus, the results are essentially the same in all cases with the possible exception of Example 52. However, Example 52 still exhibits a burst pressure significantly higher than the intrauterine horn pressure of about 1 psi and is still considered useful.

TABLE 6

In vitro burst strengths of adhesive hydrogels containing 8-arm PEG-amine (controls) or chain-extended polyamine product when used to seal holes in swine uterine horn.

| Ex. No. | chain-extended polyamine product[a] | wt % 8-arm PEG-amine or chain-extended polyamine product | burst pressure, psi |
|---|---|---|---|
| 45 Comparative | None | 25 | 3.6 |
| 46 | Ex. 26 (Pluronic ® P104) | 25 | 3.7 |
| 47 Comparative | None | 30 | 3.0 |
| 48 | Ex. 30 (Pluronic ® F88) | 30 | 2.9 |
| 49 | Ex. 31 (Pluronic ® F108) | 30 | 3.0 |
| 50 Comparative | None | 50 | 3.5 |
| 51 | Ex. 30 (Pluronic ® F88) | 50 | 3.6 |
| 52 | Ex. 31 (Pluronic ® F108) | 50 | 2.5 |

[a]The name in parentheses identifies the bifunctional crosslinker, in the form of a dimesylate, used to make the chain-extended polyamine product.

Examples 53-60

In Vitro Degradation of Adhesive Hydrogels

The following Examples demonstrate that the chain-extended polyamine product in an adhesive hydrogel is not detrimental to stability of the formed adhesive hydrogel.

Double-barreled syringes (MixPac SDL 005-01-50M) were loaded in one barrel with a 25 weight % solution of the same dextran dialdehyde as described in Example 33 and in the other barrel with a 25 weight % solution of 8-arm PEG-amine, MW 10,000 (control), or chain-extended polyamine product, and equipped with static mixing tips (8-step, MixPac ML 2.5-08-SM). Adhesive hydrogel was extruded from each double-barreled syringe into a polycarbonate circular dye (10 mm diameter×3 mm thick) to form a pellet. The pellets were weighed initially and then placed individually in jars containing phosphate-buffered saline (PBS), pH 7.4, and incubated at 37° C. on an orbital shaker set at 80 rpm. The pellets were monitored over time for degradation by visual inspection and by weight gain or loss. The results are summarized in Table 7.

TABLE 7

Mass (% of original) of Adhesive Hydrogel Pellets
Incubated in PBS, pH 7.4, at 37° C. and 80 rpm.

| | Example[a] | | | | | | | |
|---|---|---|---|---|---|---|---|---|
| | 53C | 54 | 55 | 56 | 57 | 58 | 59 | 60 |
| | | | | Adhesive | | | | |
| time, | Ex. 33 C[b] | Ex. 34 | Ex. 35 | Ex. 36 | Ex. 38 | Ex. 41 | Ex. 42 | Ex. 44 |
| | | | | Bifunctional crosslinker | | | | |
| days | None | L43 | L44 | P84 | P104 | F88 | F108 | 23% P104 |
| 0 | 100 | 100 | 100 | 100 | 100 | 100 | 100 | 100 |
| 1 | 198 | 206 | 207 | 196 | 168 | 218 | 217 | 199 |
| 2 | 194 | 201 | 202 | 187 | 165 | 217 | 214 | 194 |
| 3 | 190 | 203 | 202 | 187 | 161 | 215 | 213 | nd |
| 4 | 183 | 205 | 204 | 188 | 159 | nd | nd | 193 |
| 6 | 183 | 206 | 203 | 189 | 159 | 222 | 214 | 197 |
| 8 | 171 | 210 | 204 | 191 | 162 | nd | nd | nd |
| 9 | nd | nd | nd | nd | nd | 226 | 218 | 202 |
| 11 | 160 | 215 | 210 | 193 | 165 | 231 | 220 | 205 |
| 12 | nd | nd | nd | nd | nd | nd | nd | 205 |
| 13 | 161 | 218 | 214 | 195 | 165 | nd | nd | nd |
| 14 | 155 | 216 | 214 | 193 | 162 | nd | nd | nd |
| 17 | nd | nd | nd | nd | nd | 242 | 231 | nd |
| 20 | nd | nd | nd | nd | nd | nd | nd | 217 |
| 22 | 154 | 230 | 227 | 201 | 171 | nd | nd | nd |
| 26 | nd | nd | nd | nd | nd | nd | nd | 223 |
| 28 | 154 | 235 | 233 | 201 | 176 | nd | nd | nd |
| 31 | nd | nd | nd | nd | nd | 262 | 245 | nd |
| 39 | nd | nd | nd | nd | nd | 267 | 248 | nd |
| 40 | nd | nd | nd | nd | nd | nd | nd | 233 |
| 42 | 140 | 246 | 241 | 209 | 186 | nd | nd | nd |
| 45 | nd | nd | nd | nd | nd | 268 | 248 | nd |
| 48 | nd | nd | nd | nd | nd | nd | nd | 234 |
| 50 | 112 | 239 | 237 | 205 | 183 | nd | nd | nd |
| 54 | nd | nd | nd | nd | nd | nd | nd | 233 |
| 56 | 88 | 229 | 236 | 202 | 179 | nd | nd | nd |
| 75 | nd | nd | nd | nd | nd | 285 | 261 | nd |
| 84 | nd | nd | nd | nd | nd | nd | nd | 243 |
| 86 | nd | 224 | 243 | 201 | 188 | nd | nd | nd |

[a]Unless noted otherwise, 10% of the 8-arm PEG-amine, MW 10,000, molecules are crosslinked by the Pluronic ® crosslinker.
[b]C designates a Comparative Example, "nd" means not determined.

Examples 61-66

In Vitro Biocompatibility with NIH3T3 Mouse Fibroblasts

The following Examples demonstrate that the chain-extended polyamine product in an adhesive hydrogel is not detrimental to NIH3T3 mouse fibroblast cell cultures.

The testing was done using NIH3T3 mouse fibroblast cell cultures according to ISO10993-5:1999. The NIH3T3 mouse fibroblast cells were obtained from the American Type Culture Collection (ATCC; Manassas, Va.) and were grown in Dulbecco's modified essential medium (DMEM) supplemented with 10% fetal calf serum.

Double-barreled syringes (MixPac SDL 005-01-50M) were loaded in one barrel with a 25 weight % solution of the same dextran dialdehyde as described in Example 33 and in the other barrel with a 30 or 50 weight % solution of 8-arm PEG-amine, MW 10,000 (control), or with the chain-extended polyamine product of the examples, and equipped with static mixing tips (12-step, MixPac ML 2.5-12-DM). Adhesive hydrogel was extruded from each double-barreled syringe into the well of a polystyrene culture plate such that about one-third of the well bottom was covered. The well was then sterilized under UV light and seeded with 50,000-100,000 NIH3T3 cells. After 48 hours incubating at 37° C., the cell cultures were examined for cell rounding (indicating death), confluent coating of the well bottom, growth up to the edges of the hydrogel, and overgrowth of the hydrogel (indicating adhesion of cell cultures to the hydrogel). The results, which indicate no adverse effect on NIH3T3 mouse fibroblast cell cultures, are summarized in Table 8.

TABLE 8

In Vitro biocompatibility of adhesive hydrogels containing 8-arm PEG-amine (control) or chain-extended polyamine product with NIH3T3 mouse fibroblasts.

| Example | 61 C[b] | 62 C[b] | 63 | 64 | 65 | 66 |
|---|---|---|---|---|---|---|
| chain-extended polyamine product[a] | none | none | Ex. 26 (Pluronic ® P104) | Ex. 26 (Pluronic ® P104) | Ex. 31 (Pluronic ® F108) | Ex. 31 (Pluronic ® F108) |

TABLE 8-continued

In Vitro biocompatibility of adhesive hydrogels containing 8-arm PEG-amine (control) or chain-extended polyamine product with NIH3T3 mouse fibroblasts.

| Example | 61 C[b] | 62 C[b] | 63 | 64 | 65 | 66 |
|---|---|---|---|---|---|---|
| wt % 8-arm PEG-amine or chain-extended polyamine product | 30 | 50 | 30 | 50 | 30 | 50 |
| cell rounding | no | no | no | no | no | no |
| confluent coating | yes | yes | yes | yes | yes | yes |
| growth to the edge of the hydrogel | yes | yes | yes | yes | yes | yes |
| overgrowth of the hydrogel | no | no | no | no | no | no |

[a]The name in parentheses identifies the bifunctional crosslinker, in the form of a dimesylate, used to make the chain-extended polyamine product.
C[b] designates a Comparative Example.

Examples 67-74

Lack of In Vitro Inflammatory Response

The following Examples demonstrate that the chain-extended polyamine product in an adhesive hydrogel generates no inflammatory response in an in vitro test using J774 macrophage cells.

The testing was done using J774 mouse peritoneal macrophage cell cultures according to ISO10993-5:1999. The J774 mouse peritoneal macrophage cells were obtained from ATCC and were grown in DMEM supplemented with 10% fetal bovine serum.

Double-barreled syringes (MixPac SDL 005-01-50M) were loaded in one barrel with a 25 weight % solution of the same dextran dialdehyde as described in Example 33 and in the other barrel with a 30 or 50 weight % solution of 8-arm PEG-amine, MW 10,000 (control), or with the chain-extended polyamine product of the examples, and equipped with static mixing tips (12-step, MixPac ML 2.5-12-DM). Adhesive hydrogel was extruded from each double-barreled syringe into the well of a polystyrene culture plate such that about one-third of the well bottom was covered. The well was then sterilized under UV light and seeded with J774 mouse peritoneal macrophage cells. After 48 hours incubating at 37° C., the cell cultures were analyzed for tumor necrosis factor-alpha (TNF-α), an indicator of inflammatory response, using an ELISA assay, as described by Lara et al. (*Journal of Dental Research* 82(6):460-465, 2003). The TNF-α titer was compared to that of J774 cells incubated without any additive (negative control) or with lipopolysaccharide, a component of gram-negative bacterial cell walls (7.5 μg/mL, positive control). The results, which indicate no inflammatory response, are summarized in Table 9.

TABLE 9

TNF-α produced by J774 mouse peritoneal macrophage cells when exposed to adhesive hydrogels containing 8-arm PEG-amine or chain-extended polyamine product.

| Example | chain-extended polyamine product[a] | wt % 8-arm PEG-amine or chain-extended polyamine product | TNF-α titer, pg/mL |
|---|---|---|---|
| 67 Comparative | none | 30 | 0 |
| 68 Comparative | none | 50 | 34 |
| 69 | Ex. 26 (Pluronic ® P104) | 30 | 0 |
| 70 | Ex. 26 (Pluronic ® P104) | 50 | 0 |
| 71 | Ex. 31 (Pluronic ® F108) | 30 | 0 |
| 72 | Ex. 31 (Pluronic ® F108) | 50 | 0 |
| 73 Comparative | no additive (negative control) | | 0 |
| 74 Comparative | LPS (positive control) | | 271 |

[a]The name in parentheses identifies the bifunctional crosslinker, in the form of a dimesylate, used to make the chain-extended polyamine product.

Examples 75-81

Lack of In Vitro Inhibition of VEGF Secretion

Vascular endothelial growth factor (VEGF) is a cytokine and mitogen that promotes angiogenesis and is thus important to wound healing. The following examples demonstrate that the chain-extended polyamine product in an adhesive hydrogel does not inhibit secretion of VEGF by NIH3T3 mouse fibroblast cells.

The testing was done using NIH3T3 mouse fibroblast cell cultures according to ISO10993-5:1999. The NIH3T3 mouse fibroblast cells were obtained from ATCC and were grown in DMEM supplemented with 10% fetal calf serum.

Double-barreled syringes (MixPac SDL 005-01-50M) were loaded in one barrel with a 25 weight % solution of the same dextran dialdehyde as described in Example 33 and in the other barrel with a 30 or 50 weight % solution of 8-arm PEG-amine, MW 10,000 (control), or with the chain-extended polyamine product of the examples, and equipped with static mixing tips (12-step, MixPac ML 2.5-12-DM). Adhesive hydrogel was extruded from each double-barreled syringe into the well of a polystyrene culture plate such that about one-third of the well bottom was covered. The well was then sterilized under UV light and seeded with 50,000-100,000 NIH3T3 cells. After 48 hours incubating at 37° C., the cell cultures were analyzed for VEGF using an enzyme-linked immunosorbant assay (ELISA), as described by Lara et al. (*Journal of Dental Research* 82(6):460-465, 2003). The VEGF titers were compared to those of NIH3T3 cells incubated in blank wells (negative control). The results, which indicate no inhibition of VEGF secretion, are summarized in Table 10.

Erythema and edema at the application sites were evaluated according to the scoring system used for the ISO 10993-12 Intracutaneous Reactivity test. The results, which indicate no adverse tissue response, are summarized in Table 11.

TABLE 10

VEGF produced by NIH3T3 cells when exposed to adhesive hydrogels containing 8-arm PEG-amine or chain-extended polyamine product.

| Example | chain-extended polyamine product[a] | wt % 8-arm PEG-amine or chain-extended polyamine product | VEGF titer, pg/mL |
|---|---|---|---|
| 75 Comparative | none | 30 | 22 |
| 76 Comparative | none | 50 | 24 |
| 77 | Ex. 26 (Pluronic ® P104) | 30 | 17 |
| 78 | Ex. 26 (Pluronic ® P104) | 50 | 22 |
| 79 | Ex. 31 (Pluronic ® F108) | 30 | 17 |
| 80 | Ex. 31 (Pluronic ® F108) | 50 | 14 |
| 81 Comparative | blank well (negative control) | | 30 |

[a]The name in parentheses identifies the bifunctional crosslinker, in the form of a dimesylate, used to make the chain-extended polyamine product.

Examples-82-87

In Vivo Tissue Response on Undamaged Tissue

The following Examples demonstrate that the chain-extended polyamine product in an adhesive hydrogel causes no adverse tissue response when applied to the unbroken intestinal serosa of rabbits.

Solutions of the same dextran dialdehyde as described in Example 33 (25 weight % in de-ionized, autoclaved water), 8-arm PEG-amine, MW 10,000 (30 weight % in de-ionized, autoclaved water) and the chain-extended polyamine product of the Examples (30 weight % in de-ionized, autoclaved water) in autoclaved serum-capped vials, double-barreled syringes (MixPac SDL 005-01-50M) and static mixing tips (8-step, MixPac ML 2.5-08-SM) were sterilized by gamma irradiation. In a sterile surgical field, the sterilized double-barreled syringes were loaded in one barrel with the sterile 25 weight % solution of the dextran dialdehyde and in the other barrel with the sterile 30 weight % solution of 8-arm PEG-amine, MW 10,000 (control), or chain-extended polyamine product of the Examples and equipped with the sterile static mixing tips.

Five female White New Zealand rabbits (4.0-4.6 kg) were fasted overnight, anesthetized, shaved, scrubbed and draped. The small intestine of each rabbit was exposed by standard laparotomy technique, and the sterile adhesive hydrogel (about 0.6 mL) was extruded from the sterile double-barreled syringe to form a band 1.5 cm wide around the serosal surface of the intestine, from mesenatary to mesenatary. The hydrogel adhesive was applied at two sites. Site 1 was the duodenum, 10 cm caudal to the origin of the small intestine; site 2 was the ileum, 10-20 cm caudal to site 1. At each site, the hydrogel was allowed to set for 30 sec before further manipulation of the intestine. The peritoneum and abdomen were closed using standard surgical procedure.

Three days post surgery the rabbits were euthanized by carbon dioxide inhalation, and the treatment sites were examined immediately for presence of the adhesive, for gross tissue response and for the formation of fibrous adhesions.

TABLE 11

In vivo response when undamaged tissue was exposed to adhesive hydrogels containing 8-arm PEG-amine or chain-extended polyamine product.

| Example | chain-extended polyamine product[a] | site | adhesive present | adhesions | edema | erythema |
|---|---|---|---|---|---|---|
| 82 Comparative | none | 1 | yes[b] | no[b] | 0[b] | 0[b] |
| 83 Comparative | none | 2 | yes[b] | no[b] | 0[b] | 0[b] |
| 84 | Ex. 26 (Pluronic ® P104) | 1 | yes[b] | no[b] | 0[b] | 0[b] |
| 85 | Ex. 26 (Pluronic ® P104) | 2 | yes[b] | no[b] | 0[b] | 0[b] |
| 86 | Ex. 31 (Pluronic ® F108) | 1 | yes[b] | no[b] | 0[b] | 0[b] |
| 87 | Ex. 31 (Pluronic ® F108) | 2 | yes[b] | no[b] | 0[b] | 0[b] |

[a]The name in parentheses identifies the bifunctional crosslinker, in the form of a dimesylate, used to make the chain-extended polyamine product.
[b]The observation or score for each of the five rabbits was the same.

Examples 88-89

In Vivo Tissue Response on Damaged Tissue

The following Examples demonstrate that the chain-extended polyamine product in an adhesive hydrogel causes no adverse tissue response when applied to enterotomized intestinal serosa of rabbits.

Sterilized solutions of the same dextran dialdehyde as described in Example 33 and the chain-extended polyamine product of the examples were prepared and loaded into sterilized double-barreled syringes equipped with sterile static mixing tips as in Examples 82-85.

Five female White New Zealand rabbits (4.0-4.6 kg) were fasted overnight, anesthetized, shaved, scrubbed and draped. The small intestine of each rabbit was exposed by standard laparotomy technique and the sterile adhesive hydrogel (about 0.6 mL) was extruded from the sterile double-barreled syringe to form a band 1.5 cm wide around the serosal surface of the duodenum, 10 cm caudal to the origin of the small intestine, from mesentery to mesentery (site 1). The adhesive hydrogel was allowed to set for 2 min. The ileum was enterotomized 10-20 cm caudal to site 1 and opposite the mesentery with an incision 0.5 cm long and perpendicular to the longitudinal axis. The wound was closed with 3 or 4 interrupted 6/0 Vicryl sutures, and the sterile adhesive hydrogel was extruded from the sterile double-barreled syringe to form a band 1.5 cm wide around the serosal surface of the ileum, from mesentery to mesentery, so as to cover the site of enterotomy (site 2). After the hydrogel had set for 2 min, the peritoneum and abdomen were closed using standard surgical procedure.

Three days post surgery the rabbits were euthanized by carbon dioxide inhalation, and the treatment sites were examined immediately for presence of the adhesive, for gross tissue response and for the formation of fibrous adhesions. Erythema and edema at the application sites were evaluated according to the scoring system used for the ISO 10993-12 Intracutaneous Reactivity test. The results, which indicate no adverse tissue response, are summarized in Table 12.

TABLE 12

In vivo response when damaged tissue was exposed to adhesive hydrogels containing chain-extended polyamine product.

| Example | chain-extended polyamine product[a] | site | adhesive present | adhesions | edema | erythema |
|---|---|---|---|---|---|---|
| 86 | Ex. 26 (Pluronic ® P104) | 1 | yes[b] | no[b] | 0[b] | 0, 1, 0, 0, 0 |
| 87 | Ex. 26 (Pluronic ® P104) | 2 | yes[b] | no[b] | 0[b] | 0, 0, 0, 1, 0 |

[a]The name in parentheses identifies the bifunctional crosslinker, in the form of a dimesylate, used to make the chain-extended polyamine product.
[b]The observation or score for each of the five rabbits was the same.

Example 90

Incorporation of a Dye into the Adhesive Hydrogel Containing the Chain-Extended Polyamine Product This Example demonstrates the color stability of a dye when incorporated into the adhesive hydrogel containing chain-extended polyamine product. The dye is also stable in either of the component solutions used to form the adhesive hydrogel.

Solutions of the chain-extended polyamine product of Example 26 (25 weight %) containing 333 ppm of Acid Green 25 and of the same dextran dialdehyde as described in Example 33 (25 weight %) containing 333 ppm of Acid Green 25 were prepared in de-ionized water. The solutions were stored at RT under ambient atmosphere and observed periodically. After 42 days, both solutions were still dark turquoise-blue.

A double-barreled syringe (MixPac SDL 005-01-50M) was loaded in one barrel with a 25 weight % solution of the same dextran dialdehyde as described in Example 33 and in the other barrel with the 25 weight % solution of the chain-extended polyamine product of Example 26 containing 333 ppm of Acid Green 25, and equipped with static mixing tips (12-step, MixPac ML 2.5-12-DM). Adhesive hydrogel was extruded from the double-barreled syringe onto a glass plate to form a bead about 4 mm wide. The sealant bead was sectioned approximately in half. One section was placed in 10 mL of PBS, and the other section was placed in a ziplock plastic bag containing a paper towel thoroughly dampened with de-ionized water. Samples were observed periodically. After 1, 10 and 21 days, the hydrogel in the ziplock bag was green. No leaching or fading of color was observed. After 24 h and 10 days, the sample stored in PBS was still visibly green, but about 40% of the dye had leached into the PBS solution.

Example 91 Comparative

Color Instability of Indigo Carmine When Incorporated into Adhesive Hydrogel Containing Chain-Extended Polyamine Product This Example demonstrates the comparative color instability of indigo carmine (FD&C Blue #2) when incorporated into the adhesive hydrogel containing chain-extended polyamine product or when incorporated in either of the component solutions used to form the adhesive hydrogel.

Solutions of the chain-extended polyamine product of Example 26 (25 weight %) containing 750 ppm of indigo carmine (FD&C Blue #2) and of the same dextran dialdehyde as described in Example 33 containing 1000 ppm of indigo carmine were prepared in de-ionized water. The solutions were stored at RT under ambient atmosphere and observed periodically. After 16 h, both solutions had faded from deep midnight blue to rust orange.

A double-barreled syringe (MixPac SDL 005-01-50M) was loaded in one barrel with a 25 weight % solution of the same dextran dialdehyde as described in Example 33 and in the other barrel with the 25 weight % solution of the chain-extended polyamine product of Example 26 containing 1000 ppm of indigo carmine, and equipped with static mixing tips (12-step, MixPac ML 2.5-12-DM). Adhesive hydrogel was extruded from the double-barreled syringe onto a glass plate to form a bead about 4 mm wide. The sealant bead was sectioned approximately in half. One section was placed in 10 mL of PBS, and the other section was placed in a ziplock plastic bag containing a paper towel thoroughly dampened with de-ionized water. After 2 h, both samples had faded noticeably. After 16 h, both samples of hydrogel had faded to yellow-orange, but no leaching was observed.

Example 92

This Example illustrates the preparation of a chain-extended polyamine product derived from an 8-Arm PEG-Amine and a bifunctional crosslinker polyoxetane, MW 2,013, dimesylate in a molar ratio of 20:1.

According to the method of Example 20, 1.0 g of 8-arm PEG-amine, MW 10,000 (Example 1), was reacted with 11 mg of polyoxetane, MW 2,013, dimesylate (Example 19) to give 0.77 g (76% yield). $^1$H NMR (500 MHz, CDCl$_3$): δ 3.58 (m, ~930H), 3.46 (t, J=5.3 Hz, 16H), 3.42 (t, J=6.4 Hz, 16H), 2.81 (t, J=5.1 Hz, 14H), 2.74 (t, J=5.4 Hz, 2H), 1.76 (quint, J=6.4 Hz, 4.1H). Aqueous SEC with mass analysis by light scattering (as in Example 1) gave $M_w$ 13,150 for the chain-extended polyamine, compared to $M_w$ 11,040 for the 8-arm PEG-amine starting material.

Example 93

This Example illustrates the synthesis of a multi-arm polyether having electrophilic endgroups, 8-arm PEG, MW 10,000, octamesylate.

To 20 g of 8-arm PEG-OH, MW 10,000 (Nektar Transforming Therapeutics) dissolved in 100 mL of dichloromethane were added 4.5 mL of triethylamine and 2.5 mL of methanesulfonyl chloride. The mixture was stirred at RT overnight, diluted with 200 mL of chloroform, washed with 3×80 mL of 1 M potassium dihydrogen phosphate followed by 80 mL of saturated potassium carbonate, dried (magnesium sulfate), filtered, and evaporated (15 torr, 40° C.). The product was dried (0.06 torr) to provide 8-arm PEG, MW 10,000, octamesylate (20.1 g, 94% yield): $^1$H NMR (500 MHz, DMSO-d$_6$) δ 4.29 (m, 16H), 3.67 (m, 16H), 3.50 (m, ~900H), 3.16 (s, 24H); aqueous SEC with mass analysis by light scattering (as in Example 1) gave $M_w$ 7,300, $M_w/M_n$ 1.0, $M_z/M_w$ 1.0, and IV of 4.7 mL/g.

Example 94

This Example illustrates the synthesis of a primary diamine crosslinker, Pluronic® P104 diamine.

To Pluronic® P104 dimesylate (Example 13, 10 g) dissolved in 16 mL of acetonitrile was added 30 mL of concentrated aqueous ammonia (28% w/w). The mixture was stirred in a sealed vessel at RT for 48 h. The reaction mixture was sparged with nitrogen for 1 h and then concentrated (15 torr, 40° C.). The remaining solution was diluted with 20 mL of saturated potassium carbonate solution and extracted with 2×50 mL of chloroform. The combined chloroform layers were dried (magnesium sulfate), filtered, and evaporated (15 torr, 40° C.). The residue was dissolved in 10 mL of water, and the resulting solution was evaporated until clear (15 torr, 40° C.), frozen, and lyophilized to give 7.02 g (72% yield). $^1$H NMR (500 MHz, DMSO-$d_6$): δ 3.50 (m, ~500H), 2.62 (m, 4H), 1.03 (d, J=5.8 Hz, ~260H).

Example 95

This Example illustrates the preparation of a chain-extended polyamine product derived from a multi-arm polyether having electrophilic endgroups (8-arm PEG, MW 10,000, octamesylate) and a primary diamine crosslinker (Pluronic® P104 diamine) in a molar ratio of 20:1.

To 5.0 g of 8-arm PEG, MW 10,000, octamesylate (Example 91), dissolved in 10 mL of DMF was added 139 mg of Pluronic® P104 diamine (Example 92) in 2 mL of DMF. After the mixture had stirred at RT overnight, it was combined with 32 mL of concentrated aqueous ammonia and stirred in a sealed vessel at RT for 3 days. The reaction mixture was sparged with nitrogen for 1 h, combined with 2 g of potassium carbonate, and extracted with 3×25 mL of dichloromethane. The combined dichloromethane layers were dried (magnesium sulfate), filtered, and evaporated (15 torr, 40° C.). The product was dried further (0.06 torr) to give 4.19 g (87% yield). $^1$H NMR (500 MHz, CDCl$_3$) δ 3.60 (m, ~1080H), 3.47 (t, J=5.2 Hz, 16H), 2.82 (t, J=5.3 Hz, 15H), 2.76 (t, J=5.5 Hz, 1H), 1.10 (m, 9.8H). Aqueous SEC with mass analysis by light scattering (as in Example 1) gave $M_w$ 37,660 for the chain-extended polyamine, compared to $M_w$ 7,300 for the 8-arm PEG octamesylate starting material.

Example 96

This Example illustrates the preparation of a chain-extended polyamine product derived from a 4-arm PEG-amine and a bifunctional crosslinker PEG-PPG-PEG (Pluronic® P104) dimesylate in a molar ratio of 20:1.

To 1.00 g of 4-arm PEG-amine, MW 2,000 (Example 4), dissolved in 2 mL of DMF and 1 mL of dichloromethane was added 0.151 g of PEG-PPG-PEG (Pluronic® P104) dimesylate (Example 13) dissolved in 1 mL of dichloromethane and the mixture was stirred at RT overnight. The mixture was diluted with 10 mL of chloroform and washed with 3×2 mL of 1 M potassium carbonate. The combined aqueous washes were back-extracted with 1 mL of chloroform. The combined chloroform layers were dried (magnesium sulfate), filtered, and evaporated (15 torr, 40° C.) to give 1.07 g (93% yield). $^1$H NMR (500 MHz, CDCl$_3$) δ 3.60 (m, ~238H), 3.38 (m, 14H), 2.82 (m, 7H), 2.76 (t, J=5.4 Hz, 1H), 1.10 (m, 10.5H). Aqueous SEC with mass analysis by light scattering (as in Example 1) gave $M_w$ 3,600 for the chain-extended polyamine, compared to $M_w$ 2,420 for the 4-arm PEG-amine starting material.

Example 97

This Example illustrates the synthesis of a primary diamine crosslinker, PEG 6000 diamine.

To PEG 6000 dimesylate (Example 6, 3.0 g) dissolved in 4 mL of acetonitrile was added 8 mL of concentrated aqueous ammonia (28% w/w). The mixture was stirred in a sealed vessel at RT for 48 h. The reaction mixture was partitioned between 30 mL of chloroform and 10 mL of saturated potassium carbonate solution. The chloroform layer was dried (magnesium sulfate), filtered, and evaporated (15 torr, 40° C.). The residue was further dried under vacuum (0.2 torr, RT) to give 2.64 g (89% yield). $^1$H NMR (500 MHz, DMSO-$d_6$): δ 3.50 (m, ~5781), 2.63 (t, J=5.8 Hz, 4H).

Example 98

This Example illustrates the synthesis of a diisocyanate crosslinker, PEG 6000 diisocyanate.

To 1 g of PEG 6000 diamine (Example 97) dissolved in 25 mL of toluene was added 60 mg of triphosgene and 0.28 mL of diisopropylethylamine. The reaction mixture was heated to 70-80° C. under nitrogen for 3 h. The reaction mixture was cooled to RT and diluted with 20 mL of petroleum ether. The precipitate formed was isolated by filtration, washed with petroleum ether and dried under vacuum (0.2 torr, RT). $^1$H NMR (500 MHz, CDCl$_3$): δ 3.60 (m, ~708H), 3.37 (t, J=5.2 Hz, 4H). This product was used without further purification in Example 99.

Example 99

This Example illustrates the preparation of a chain-extended polyamine product derived from an 8-arm PEG-amine and a bifunctional crosslinker, PEG 6000 diisocyanate, in a molar ratio of 20:1.

To 1.00 g of 8-arm PEG-amine, MW 10,000 (Example 1), dissolved in 3 mL of dichloromethane was added 36 mg of PEG 6000 diisocyanate (Example 98) dissolved in 1 mL of dichloromethane and the mixture was stirred at RT for 1 h. The mixture was diluted with 10 mL of chloroform and washed with 2×2 mL of 1 M potassium dihydrogen phosphate followed by 3×2 mL of 1 M potassium carbonate. The combined aqueous washes were back-extracted with 1 mL of chloroform. The combined chloroform layers were dried (magnesium sulfate), filtered, and evaporated (15 torr, 40° C.) to give the chain-extended polyamine product. $^1$H NMR (500 MHz, CDCl$_3$) δ 3.61 (m, ~1000H), 3.32 (q, J=5.4 Hz, 14H), 2.78 (t, J=5.0 Hz, 12H). Aqueous SEC with mass analysis by light scattering [30° C., phosphate buffered saline (PBS, 10 mM phosphate, 2.7 mM KCl, 0.137 M NaCl, pH 7.4), 0.5 mL/min, two Suprema Linear M mixed-bed columns+1 Lux Suprema 1000A column (Polymer Standards Services), dn/dc 0.135 mL/g] gave $M_w$ 18,230 for the chain-extended polyamine, compared to $M_w$ 13,170 for the 8-arm PEG-amine starting material.

What is claimed is:

1. A composition of matter made by a process comprising the steps of:
   a) reacting, optionally in a first reaction solvent, at least one multi-arm polyether having at least three arms and having at least three electrophilic endgroups, with a primary diamine crosslinker of the formula:

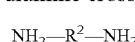

the molar ratio of the multi-arm polyether to the primary diamine crosslinker being in the range of about 4:1 to about 50:1, thereby forming a chain-extended polymer having remaining electrophilic endgroups; and, b) treating, optionally in a second reaction solvent, said chain extended polymer so as to convert the remaining electrophilic end groups to amine end groups to provide a chain-extended polyamine product; wherein:

(i) at least three of the arms of said multi-arm polyether are terminated by electrophilic endgroups capable of reacting with a primary amine to form a carbon-nitrogen bond;

(ii) the multi-arm polyether has a weight-average molecular weight of about 450 to about 200,000 Daltons;

(iii) $R^2$ is a divalent polymer group; and (iv) $NH_2$—$R^2$—$NH_2$ is a polymer having a weight-average molecular weight of about 2,000 to about 20,000 Daltons;

provided that the chain-extended polyamine product is characterized by a solubility in water at 20° C. of at least 20 wt %.

2. The composition of claim 1 wherein the electrophilic endgroups are selected from the group consisting of: —OMs, —OTs, —OTf, tresylate, Cl, Br, and I; and step (b) comprises reacting the chain-extended polymer with ammonia to provide the chain-extended polyamine product.

3. The composition of claim 1 wherein the electrophilic endgroups are selected from the group consisting of: —OMs, —OTs, —OTf, tresylate, Cl, Br, and I; and step (b) comprises the steps of (i) reacting the chain-extended polymer with an alkali metal azide to provide a chain-extended azido polymer; and (ii) reducing the chain-extended azido polymer with a reducing agent to provide the chain-extended polyamine product.

4. The composition of claim 1 wherein the electrophilic endgroups are carboxylic acids, step (a) further comprises a diimide dehydrating agent, and step (b) comprises the steps of:

(i) reacting the chain-extended polymer with sufficient amount of acid halide reagent to provide a chain-extended acid halide polymer;

(ii) reacting the chain-extended acid halide polymer with sufficient ammonia to provide a chain extended primary amide polymer; and (iii) reacting the chain-extended primary amide polymer with sufficient active halogen source and an alkali metal hydroxide to provide the chain-extended polyamine product.

5. The composition of claim 1 wherein the electrophilic endgroups are carboxylic acids, step (a) further comprises a diimide dehydrating agent, and step (b) comprises the steps of:

(i) reacting the chain-extended polymer with sufficient amount of acid halide reagent to provide a chain-extended acid halide polymer;

(ii) reacting the chain-extended acid halide polymer with sufficient alkali metal azide to provide a chain-extended acyl azide polymer; and (iii) heating the chain-extended acyl azide polymer to induce rearrangement to provide the chain-extended polyamine product.

6. The composition of claim 1 wherein the electrophilic endgroups are activated carboxylic esters or carboxylic acid chlorides, and step (b) comprises the steps of:

(i) reacting the chain-extended polymer with sufficient ammonia to provide a chain extended primary amide polymer; and (ii) reacting the chain-extended primary amide polymer with sufficient active halogen source and an alkali metal hydroxide to provide the chain-extended polyamine product.

7. The composition of claim 1 wherein the electrophilic endgroups are activated carboxylic esters or carboxylic acid chlorides, and step (b) comprises the steps of:

(i) reacting the chain-extended polymer with sufficient alkali metal azide to provide a chain extended acyl azide polymer, and (ii) heating the chain-extended acyl azide polymer to induce rearrangement to provide the chain-extended polyamine reaction product.

8. The composition of claim 1 wherein the electrophilic endgroups are aldehydes, and step (b) comprises the steps of:

(i) reacting the chain-extended polymer with sufficient ammonia to provide a chain-extended imine polymer; and (ii) reducing the chain-extended imine polymer to provide the chain-extended polyamine product.

9. The composition of claim 1 further characterized by a weight-average molecular weight determined by size exclusion chromatography that is at least about 10% higher than the weight-average molecular weight of the multi-arm polyether used to make the chain extended polyamine product.

10. The composition of claim 1 wherein the divalent polymer group $R^2$ is selected from the group consisting of divalent homopolymers of ethylene oxide, and divalent block and random copolymers of ethylene oxide and propylene oxide.

* * * * *